US011918524B2

(12) United States Patent
Johnson et al.

(10) Patent No.: US 11,918,524 B2
(45) Date of Patent: Mar. 5, 2024

(54) BED SYSTEMS AND METHODS

(71) Applicant: KAP Medical, Inc., Corona, CA (US)

(72) Inventors: Michael Karl Johnson, Norco, CA (US); Taylor Allen Ressel, Corona, CA (US)

(73) Assignee: KAP MEDICAL, INC., Corona, CA (US)

( * ) Notice: Subject to any disclaimer, the term of this patent is extended or adjusted under 35 U.S.C. 154(b) by 845 days.

(21) Appl. No.: 16/253,613

(22) Filed: Jan. 22, 2019

(65) Prior Publication Data

US 2019/0151171 A1 May 23, 2019

Related U.S. Application Data

(62) Division of application No. 15/405,990, filed on Jan. 13, 2017, now Pat. No. 10,231,889, which is a division of application No. 14/208,987, filed on Mar. 13, 2014, now Pat. No. 9,572,735.

(60) Provisional application No. 61/791,496, filed on Mar. 15, 2013.

(51) Int. Cl.

| | |
|---|---|
| ***A61G 7/012*** | (2006.01) |
| ***A61G 7/005*** | (2006.01) |
| ***A61G 7/015*** | (2006.01) |
| ***A61G 7/018*** | (2006.01) |
| ***A61G 7/05*** | (2006.01) |
| ***A61G 7/08*** | (2006.01) |

(52) U.S. Cl.

CPC ............. *A61G 7/012* (2013.01); *A61G 7/005* (2013.01); *A61G 7/015* (2013.01); *A61G 7/018* (2013.01); *A61G 7/0506* (2013.01); *A61G 7/0507* (2013.01); *A61G 7/08* (2013.01)

(58) Field of Classification Search

CPC .... A61G 2200/16; A61G 7/015; A61G 7/002; A61G 7/018; A61G 7/012; A61G 7/005; A61G 7/0506; A61G 7/0507; A61G 7/08

See application file for complete search history.

(56) References Cited

U.S. PATENT DOCUMENTS

| | | | |
|---|---|---|---|
| 3,823,428 | A | 7/1974 | Whyte |
| 3,958,283 | A | 5/1976 | Adams et al. |
| 5,636,394 | A | 6/1997 | Bartley |
| 5,692,254 | A | 12/1997 | Boettcher |
| 6,212,714 | B1 | 4/2001 | Allen et al. |

(Continued)

FOREIGN PATENT DOCUMENTS

| | | |
|---|---|---|
| CA | 2718539 | 10/2009 |
| CN | 101999967 | 6/2011 |

(Continued)

OTHER PUBLICATIONS

Frame. (n.d.) American Heritage® Dictionary of the English Language, Fifth Edition. (2011). Retrieved Mar. 10, 2023 from https://www.thefreedictionary.com/frame (Year: 2011).*

(Continued)

*Primary Examiner* — David R Hare
*Assistant Examiner* — Amanda L Bailey

(57) ABSTRACT

A bed is provided. The bed may include a lift system which raises and lowers a support deck of the bed. The lift system may include multiple individually actuatable lift systems. The bed may include an expandable support deck. The bed may include a powered caster braking system.

8 Claims, 30 Drawing Sheets

(56) References Cited

U.S. PATENT DOCUMENTS

| | | | |
|---|---|---|---|
| 6,321,878 B1 | 11/2001 | Mobley et al. | |
| 6,357,065 B1 * | 3/2002 | Adams | A61G 7/015 5/617 |
| 6,658,680 B2 | 12/2003 | Osborne et al. | |
| 7,100,225 B1 | 9/2006 | Bailey | |
| 7,334,277 B2 | 2/2008 | Johnson | |
| 7,406,729 B2 | 8/2008 | Hornbach | |
| 7,428,760 B2 | 9/2008 | McCrimmon | |
| 7,454,809 B2 | 11/2008 | Gowda | |
| 7,676,866 B2 | 3/2010 | Toms et al. | |
| 7,690,059 B2 | 4/2010 | Lemire et al. | |
| 7,805,784 B2 | 10/2010 | Lemire et al. | |
| 7,845,032 B2 | 12/2010 | Chambers et al. | |
| 7,861,334 B2 | 1/2011 | Lemire et al. | |
| 7,913,335 B2 | 3/2011 | Carr | |
| 8,151,387 B2 | 4/2012 | Osborne et al. | |
| 8,997,282 B2 | 4/2015 | Bossingham et al. | |
| 9,009,888 B1 | 4/2015 | Tekulve | |
| 11,020,299 B2 | 6/2021 | Gowda et al. | |
| 2006/0021142 A1 * | 2/2006 | Hornbach | A61G 7/0509 5/600 |
| 2006/0026767 A1 * | 2/2006 | Chambers | A61G 7/0514 5/713 |
| 2006/0085913 A1 | 4/2006 | Kawakami | |
| 2007/0136949 A1 | 6/2007 | Richards | |
| 2007/0157385 A1 * | 7/2007 | Lemire | A61M 5/1415 5/618 |
| 2008/0000028 A1 | 1/2008 | Lemire | |
| 2008/0010748 A1 | 1/2008 | Menkedick et al. | |
| 2008/0098532 A1 | 5/2008 | Gowda | |
| 2008/0189856 A1 | 8/2008 | Toms et al. | |
| 2009/0077748 A1 | 6/2009 | Kim | |
| 2009/0229050 A1 | 9/2009 | Helmbrock | |
| 2009/0282616 A1 | 11/2009 | Carr | |
| 2010/0005592 A1 | 1/2010 | Poulos | |
| 2010/0022372 A1 | 1/2010 | Kobierzycki et al. | |
| 2010/0223728 A1 | 9/2010 | Hutchison et al. | |
| 2011/0113561 A1 | 5/2011 | Douglas | |
| 2011/0162141 A1 | 7/2011 | Lemire et al. | |
| 2013/0139318 A1 | 6/2013 | Paz | |
| 2013/0298331 A1 | 11/2013 | Bossingham | |
| 2014/0047641 A1 | 2/2014 | Thodupunuri | |
| 2014/0215717 A1 | 8/2014 | Rigsby | |
| 2014/0259413 A1 | 9/2014 | Johnson et al. | |
| 2017/0128294 A1 | 5/2017 | Johnson et al. | |

FOREIGN PATENT DOCUMENTS

| | | |
|---|---|---|
| CN | 102247252 | 11/2011 |
| DE | 1248231 B | 8/1967 |
| DE | 9313149 U1 | 10/1993 |
| DE | 29820268 U1 | 1/1999 |
| DE | 19962079 A1 | 6/2001 |
| EP | 0074460 | 3/1983 |
| FR | 2726982 | 5/1996 |

OTHER PUBLICATIONS

EP Supplementary Search Report; European Patent Office; EP Application No. EP14764649; dated Jul. 5, 2016.

International Preliminary Report on Patentability dated Sep. 15, 2015 from the International Bureau in related International Application No. PCT/US2014/029069.

International Search Report and Written Opinion of the International Searching Authority for PCT/US2014/029069, dated Aug. 7, 2014, 13 pages.

Australia Patent Office, Application No. 2014228982, Examination Report dated Dec. 1, 2017, 8 pages.

* cited by examiner

BACKSIDE OF CASTER AXLE

BED SYSTEMS AND METHODS

RELATED APPLICATION

The present application is a divisional application of U.S. application Ser. No. 15/405,990, filed Jan. 13, 2017, titled BED SYSTEMS AND METHODS which is a divisional application of U.S. application Ser. No. 14/208,987 (now U.S. Pat. No. 9,572,735), filed Mar. 13, 2014, titled BED SYSTEMS AND METHOD which claims the benefit of U.S. Provisional Application Ser. No. 61/791,496, filed Mar. 15, 2013, titled BED SYSTEMS AND METHOD, the entire disclosures of which are expressly incorporated by reference herein.

FIELD

The disclosure relates in general to beds and, more particularly, to beds having moveable frame components.

BACKGROUND

Some hospital patients have a tendency to roll out of a hospital bed. Falling from a surface of a normal height bed presents a significant risk of injury. To prevent a patient from falling off the surface of a bed, hospitals and care facilities have used various types of restraints to secure patients. However, patient restraints are no longer a viable option in many hospitals. One widely accepted solution to this problem has been to bring or locate the mattress platform of the bed as close to the surface floor as possible, yet still have the bed be able to raise the mattress platform back to normal bed height if not higher. The construction of an extremely low profile bed is limited by design due to the arrangement of the actuators to achieve angles of lift. When the frame of the bed folds up into itself to minimize the bed frame height in order to bring the patient support platform as close as possible to the floor, the actuators lose most of their vertical force component due to a shallow angle created by the actuators positioning themselves almost horizontally relative to the floor. In addition, often the caster wheels which are needed to move the bed with or without a patient in the bed are placed under the bed deck as well thus limiting the bed's ability to go as low as possible.

Accordingly, it is desirable to provide an improved bed system that overcomes one or more of the aforementioned drawbacks or other limitations of the prior art.

BRIEF DESCRIPTION OF THE DRAWINGS

The mentioned features and advantages and other features and advantages of this disclosure, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. The exemplifications set out herein illustrate exemplary embodiments of the invention and such exemplifications are not to be construed as limiting the scope of the invention in any manner.

DETAILED DESCRIPTION OF THE DRAWINGS

Figure 1:
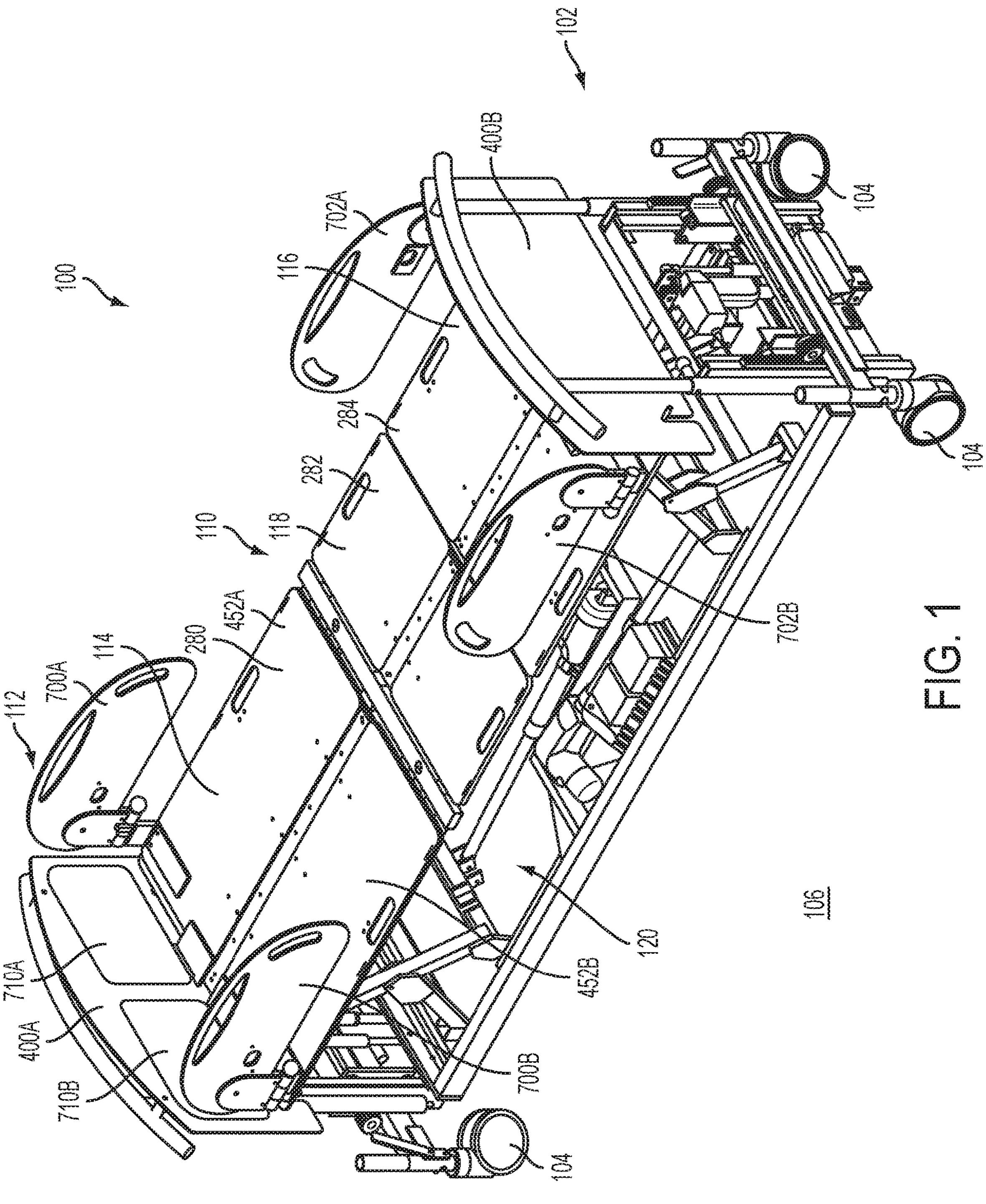
FIG. 1 illustrates a perspective view of an exemplary bed having a lift system, the exemplary bed being shown with the support deck in a raised position.

The embodiments disclosed herein are not intended to be exhaustive or to limit the invention to the precise forms disclosed in the following detailed description. Rather, the embodiments are chosen and described so that others skilled in the art may utilize their teachings.

In an exemplary embodiment of the present disclosure, a bed adapted to be supported on a floor is provided. The bed comprising a plurality of wheels contacting the floor; a headboard and a footboard, the footboard spaced apart from the headboard, the headboard and the footboard supported by the plurality of wheels; a support deck supported by the plurality of wheels, the support deck including a head end positioned proximate the headboard and a foot end positioned proximate the footboard, and at least one support surface extending between the head end of the support deck and the foot end of the support deck; a first lift system supported by the plurality of wheels, the first lift system operatively coupled to the support deck to raise and lower the support deck relative to the plurality of wheels while the plurality of wheels remain in contact with the floor, the first lift system is configured to raise and lower the head end of the support deck and the foot end of the support deck with the foot end of the support deck being generally horizontally aligned with the head end of the support deck; and a second lift system supported by the plurality of wheels, the second lift system operatively coupled to the support deck to raise and lower the support deck relative to the plurality of wheels while the plurality of wheels remain in contact with the floor, the second lift system is configured to raise and lower the head end of the support deck and the foot end of the support deck with the foot end of the support deck being generally horizontally aligned with the head end of the support deck.

In one example, the first lift system is further configured to raise and lower at least one of the head end of the support deck and the foot end of the support deck independent of the other of the head end of the support deck and the foot end of the support deck.

In another example, the second lift system is further configured to raise and lower at least one of the head end of the support deck and the foot end of the support deck independent of the other of the head end of the support deck and the foot end of the support deck.

In a further example, the first lift system is operatively coupled to the second lift system to raise and lower the second lift system relative to the plurality of wheels while the plurality of wheels remain in contact with the floor. In a variation thereof, the first lift system does not alter the position of the support deck relative to the second lift system as the first lift system raises or lowers the second lift system relative to the plurality of wheels. In another variation thereof, the plurality of wheels define a horizontally extending envelope and wherein when viewed from a top view, both of the first lift system and the second lift system are positioned within the horizontally extending envelope defined by the plurality of wheels. in still another variation thereof, the first lift system is coupled to a first base supported by a first portion of the plurality of wheels and a second base supported by a second portion of the plurality of wheels, a head end of the first lift system is coupled to the first base and a foot end of the first lift system is coupled to the second base, the first lift system further includes a middle portion extending between the head end of the first lift frame and the foot end of the first lift frame. in a refinement of the still another variation, the second lift system includes a lower frame and an upper frame, a separation between the lower frame and the upper frame being adjusted as the second lift frame raises and lowers the support deck, the first lift system and the second lift system cooperating to place the support deck in a first raised position and in a first lowered position, wherein when the support deck is in the first raised position both the middle portion of the first lift system and the entire lower frame of the second lift system are completely above a first horizontal plane passing through a first rotational axis of a first wheel of the first portion of the plurality of wheels and a second rotational axis of a second wheel of the second portion of the plurality of wheels and when the support deck is in the first lowered position, at least a portion of the middle portion of the first lift system and a portion of the lower frame of the second lift system are below the first horizontal plane. In a further refinement, when the support deck is in the first lowered position at least a portion of the upper frame of the second lift system is below the first horizontal plane. in still a further refinement, when the at least one support surface of the support deck is generally horizontal and the support deck is in the first lowered position, the support surface of the support deck is generally aligned with a second horizontal plane parallel to the first horizontal plane and passing through an upper edge of the first wheel. In still yet a further refinement, the first lift system and the second lift system cooperate to place the support deck in the first raised position and in the first lowered position, wherein when the at least one support surface of the support deck is generally horizontal and the support deck is in the first raised position, the at least one support surface is at least about 30 inches above the floor.

In still another example, the first lift system and the second lift system cooperate to place the support deck in a first raised position and in a first lowered position. In a variation thereof, the bed further comprises a first power system supported by the plurality of wheels, wherein the support deck is a laterally expandable support deck which is expandable by the first power system between a first lateral width and a second lateral width while the support deck is in the first lowered position. In a refinement thereof, when the at least one support surface of the support deck is generally horizontal and the support deck is in the first lowered position, the at least one support surface is within about 6 inches from the floor. in another refinement thereof, the bed further comprises a second power system supported by the plurality of wheels, wherein the support deck includes a plurality of support sections which are coupled together to form an articulating support deck, the second power system controls the relative positions of the plurality of support sections, the second power system to permit an articulation of the support deck while the support deck is in the first lowered position. In a refinement thereof, when the at least one support surface of the support deck is generally horizontal and the support deck is in the first lowered position, the at least one support surface is within about 6 inches from the floor. In a further refinement thereof, when the support deck is in the first lowered position, both the first lift system and the second lift system are spaced apart from the floor.

In yet another example, the plurality of wheels define a horizontally extending envelope and wherein when viewed from a top view, both of the first lift system and the second lift system are positioned within the horizontally extending envelope defined by the plurality of wheels.

In still yet another example, the first lift system is coupled to a first base supported by a first portion of the plurality of wheels and a second base supported by a second portion of the plurality of wheels, a head end of the first lift system is coupled to the first base and a foot end of the first lift system is coupled to the second base, the first lift system further includes a horizontally extending portion extending between the head end of the first lift frame and the foot end of the first lift frame, a first lift system horizontal centerline of the horizontally extending portion of the first lift system being located midway between an upper surface of the horizontally extending portion of the first lift system and a lower surface of the horizontally extending portion of the first lift system, the second lift system includes a lower frame and an upper frame, a separation between the lower frame and the upper frame being adjusted as the second lift frame raises and lowers the support deck, the second lift frame having a horizontal centerline located midway between an upper surface of the upper frame and a lower surface of the lower frame, wherein when the support deck is in a first raised position the horizontal centerline of the second lift frame is positioned above the horizontal centerline of the first lift frame and when the support deck is in a first lowered position the horizontal centerline of the second lift frame is generally aligned with the horizontal centerline of the first lift frame. In a variation thereof, when the support deck is in the first lowered position, both the first lift system and the second lift system are spaced apart from the floor.

In still yet another example, the second lift system being configured to raise and lower the support deck independently of the first lift system.

In another exemplary embodiment of the present disclosure, a bed adapted to be supported on a floor is provided. The bed comprising a plurality of wheels contacting the floor; a headboard and a footboard, the footboard spaced apart from the headboard, the headboard and the footboard supported by the plurality of wheels; a support deck supported by the plurality of wheels, the support deck including a head end positioned proximate the headboard and a foot end positioned proximate the footboard, and at least one support surface extending between the head end of the support deck and the foot end of the support deck; a first lift system supported by the plurality of wheels, the first lift system operatively coupled to the support deck to raise and lower the support deck relative to the plurality of wheels through an actuation of at least a first vertical linear actuator arranged to have a generally vertical longitudinal axis; and a second lift system supported by the plurality of wheels, the second lift system operatively coupled to the support deck to raise and lower the support deck relative to the plurality of wheels through an actuation of least a first horizontal linear actuator arranged to have a generally horizontal longitudinal axis.

In an example, the first lift system includes a first rack and pinion system driven by the first vertical linear actuator. In a variation thereof, the first rack and pinion system is positioned proximate the headboard and the first lift system further includes a second rack and pinion system driven by a second vertical linear actuator, the second rack and pinion system being positioned proximate the footboard. In a refinement thereof, the second lift system is positioned between the first rack and pinion system and the second rack and pinion system. In another variation, the first rack and pinion system includes at least a first rack engaged by a first pinion gear and a second rack engaged by a second pinion gear, the first vertical linear actuator being positioned between the first rack and the second rack. In still another variation, the second lift system includes a first scissor jack system driven by the first horizontal linear actuator. In a refinement thereof, the first scissor jack system is positioned proximate the headboard and the second lift system further includes a second scissor jack system driven by a second horizontal linear actuator, the second scissor jack system being positioned proximate the footboard.

In another example, the second lift system includes a first scissor jack system driven by the first horizontal linear actuator. In a variation thereof, the first scissor jack system is positioned proximate the headboard and the second lift system further includes a second scissor jack system driven by a second horizontal linear actuator, the second scissor jack system being positioned proximate the footboard.

In still another example, the second lift system raises and lowers the support deck independently of the first lift system.

In yet another exemplary embodiment of the present disclosure, a bed adapted to be supported on a floor is provided. The bed comprising a plurality of wheels contacting the floor; a headboard and a footboard, the footboard spaced apart from the headboard, the headboard and the footboard supported by the plurality of wheels; a support deck supported by the plurality of wheels, the support deck including a head end positioned proximate the headboard and a foot end positioned proximate the footboard, and at least one support surface extending between the head end of the support deck and the foot end of the support deck; a first lift system supported by the plurality of wheels, the first lift system operatively coupled to the support deck to raise and lower the support deck relative to the plurality of wheels, the first lift system is configured to raise and lower the head end of the support deck and the foot end of the support deck with the foot end of the support deck being generally horizontally aligned with the head end of the support deck; and a second lift system supported by the plurality of wheels, the second lift system operatively coupled to the support deck to raise and lower the support deck relative to the plurality of wheels, the second lift system is configured to raise and lower the head end of the support deck and the foot end of the support deck with the foot end of the support deck being generally horizontally aligned with the head end of the support deck, wherein the plurality of wheels define a horizontally extending envelope and wherein when viewed from a top view both of the first lift system and the second lift system are positioned within the horizontally extending envelope defined by the plurality of wheels.

In an example, the second lift system raises and lowers the support deck independently of the first lift system.

In another example, the second lift system nests within an open portion of the first lift system.

In yet another example, the second lift system is supported by the first lift system.

In still yet another example, the bed further comprises a plurality of load cells, wherein the load cells are coupled to the first lift system and the second lift system is supported by the first lift system through the load cells.

In still yet another exemplary embodiment of the present disclosure, a bed adapted to be supported on a floor is provided. The bed comprising a plurality of wheels contacting the floor; a headboard and a footboard, the footboard spaced apart from the headboard, the headboard and the footboard supported by the plurality of wheels; a support deck supported by the plurality of wheels, the support deck including a head end positioned proximate the headboard and a foot end positioned proximate the footboard, and at least one support surface extending between the head end of the support deck and the foot end of the support deck; a first lift system supported by the plurality of wheels, the first lift system having a head end positioned proximate the head-board, a foot end positioned proximate the footboard, and a middle portion extending between the head end and the foot end, the first lift system including first means to raise and lower the support deck; and a second lift system supported by the plurality of wheels, the second lift system having a head end positioned proximate the headboard, a foot end positioned proximate the footboard, and a middle portion extending between the head end and the foot end, the second lift system including second means to raise and lower the support deck.

In a further exemplary embodiment, a method of adjusting a height of a support deck of a bed relative to a floor is provided. The method comprising the steps of supporting the support deck with a plurality of lift systems, each lift system being individually actuatable to alter the height of the support deck while an orientation of the support deck remains unchanged; supporting the plurality of lift systems with a plurality of wheels; and maintaining the plurality of wheels in contact with the floor while a first lift system of the plurality of lift systems is actuated to alter the height of the support deck and while a second lift system of the plurality of lift systems is actuated to alter the height of the support deck.

In yet a further exemplary embodiment of the present disclosure, a bed adapted to be supported on a floor is provided. The bed comprising a plurality of wheels contacting the floor; a frame supported by the plurality of wheels; a support deck supported by the frame and having a head end, a foot end, a first side extending from the head end to the foot end, and a second side extending from the head end to the foot end, the support deck being expandable in at least one of a longitudinal extent from the head end to the foot end and a transverse extent from the first side to the second side from a first size to a second size, the second size having a larger area than the first size; a barrier supported by the plurality of wheels, the barrier extending above and generally surrounding the support deck, the barrier including a plurality of spaced apart barrier components, a perimeter of the barrier from a top view has a plurality of gaps formed by a plurality of spaces between the barrier components, wherein as the support deck is expanded from the first size to the second size the respective sizes of the plurality of gaps generally remains unchanged.

In an example, a first portion of the plurality of barrier components are supported by the support deck and a second portion of the plurality of barrier components are supported by the frame. in a variation thereof, the support deck extends in the transverse extent and the first portion of the plurality of barrier components includes a first head end barrier component and the second portion of the plurality of barrier components includes a second head end barrier component, the first head end barrier component overlapping the second head end barrier component from the top view. In a refinement thereof, the first head end barrier overlaps the second head end barrier by a first amount when the support deck is at the first size and a second amount when the support deck is at the second size, the second amount being less than the first amount. In a further refinement thereof, the first head end barrier is pivotally coupled to the support deck. In another variation, the support deck extends in the transverse extent and the first portion of the plurality of barrier components includes a first foot end barrier component and the second portion of the plurality of barrier components includes a second foot end barrier component, the first foot end barrier component overlapping the second foot end barrier component from the top view. In a refinement thereof, the first foot end barrier overlaps the second foot end barrier by a first amount when the support deck is at the first size and a second amount when the support deck is at the second size, the second amount being less than the first amount. In a further refinement thereof, the first foot end barrier is pivotally coupled to the support deck.

In yet still another exemplary embodiment of the present disclosure, a method of providing a patient restraint around a support deck of a bed, the support deck being supported by a frame, the support deck being expandable in at least one of a longitudinal extent from a head end of the support deck to a foot end of the support deck and a transverse extent from a first side of the support deck which extends from the head end to the foot end to a second side of the support deck which extends from the head end to the foot end from a first size to a second size, the second size having a larger area than the first size. The method comprising the steps of supporting a first plurality of barrier components with the support deck; supporting a second plurality of barrier components with the frame independent of the support deck; forming with the first plurality of barrier components and the second plurality of barrier components a barrier extending above the support deck, the barrier including a plurality of gaps; and maintaining a size of each of the gaps of the barrier as the support deck extends from the first size to the second size. In an example, the support deck extends in the transverse extent.

In a further exemplary embodiment of the present disclosure, a bed adapted to be supported on a floor is provided. The bed comprising a plurality of wheels contacting the floor; a frame supported by the plurality of wheels; a support deck supported by the frame and having a head end, a foot end, a first side extending from the head end to the foot end, and a second side extending from the head end to the foot end, the support deck being expandable in a transverse extent from the first side to the second side from a first size to a second size, the second size having a larger area than the first size. The support deck comprising a central plate; a first side plate slidably coupled to the central plate, the first side plate and the central plate being arranged in an overlapping arrangement; and a second side plate slidably coupled to the central plate, the second side plate and the central plate being arranged in an overlapping arrangement.

In an example thereof, the second side plate and the first side plate are arranged in a side-by-side, non-overlapping arrangement.

In another example thereof, the first side plate is supported directly by the central plate, an outer side of the first side plate is unsupported when the support deck is expanded to the second size.

In yet still a further exemplary embodiment of the present disclosure, a bed adapted to be supported on a floor is provided. The bed comprising a plurality of wheels contacting the floor; a frame supported by the plurality of wheels; a support deck supported by the frame and having a head end, a foot end, a first side extending between the head end to the foot end, and a second side extending between the head end to the foot end, the support deck being expandable in a transverse extent from the first side to the second side from a first size to a second size, the second size having a larger area than the first size; an assembly coupled to the support deck, the assembly including a single powered mechanical actuator which expands the support deck from the first size to the second size.

In an example thereof, the mechanical system includes an actuator frame; a first support moveable relative to the actuator frame and coupled to a first portion of the support deck; a second support moveable relative to the actuator frame and coupled to a second portion of the support deck, wherein the single powered mechanical actuator controls a position of the first support member and a position of the second support member to expand the support deck from the first size to the second size. In a variation thereof, the single powered mechanical actuator drives a first screw, the first support being moveable along a first longitudinal axis of the first screw. In a refinement thereof, the second support is moveable along a longitudinal axis of a second screw, the second screw being driven by the single powered mechanical actuator. In a further refinement thereof, the second screw rotates counter to the first screw to cause the support deck to expand from the first size to the second size. In still a further refinement thereof, the second screw is coupled to the first screw through a gear set, the first screw driving the second screw.

In still a further exemplary embodiment of the present disclosure, a method of expanding a support deck of a bed is provided. The support deck being supported by a frame, the support deck being expandable in a transverse extent from a first side of the support deck which extends between a head end of the bed to a foot end of the bed to a second side of the support deck which extends between the head end of the bed to the foot end of the bed from a first size to a second size, the second size having a larger area than the first size. The method comprising the steps of coupling a first portion of the support deck to a single powered mechanical actuator; coupling a second portion of the support deck to the single powered mechanical actuator; automatically increasing a separation between an outer side edge of the first portion of the support deck and an outer side edge of the second portion of the support deck through the single powered mechanical actuator to expand the support deck from the first size to the second size.

In yet still a further exemplary embodiment of the present disclosure, a bed adapted to be supported on a floor is provided. The bed comprising a plurality of wheels contacting the floor; a plurality of endboards, the plurality of endboards including a headboard and a footboard, the footboard spaced apart from the headboard, the headboard and the footboard supported by the plurality of wheels; a support deck supported by the plurality of wheels, the support deck including a head end positioned proximate the headboard and a foot end positioned proximate the footboard, and at least one support surface extending between the head end of the support deck and the foot end of the support deck; a lift system supported by the plurality of wheels, the lift system operatively coupled to the support deck to raise and lower the support deck relative to the plurality of wheels, the lift system moves the support deck between a first raised position and a first lowered position, wherein when the support deck is in the first raised position a first endboard of the plurality of endboards is coupled to the lift system to move with the support deck and when the support deck is in the first lowered position the first endboard is uncoupled from the lift system resulting in the support deck moving independently of the first endboard.

In an example, the first endboard is the headboard. In another example, the first endboard is the footboard.

In a further example, the first endboard is supported by the lift system in both when the support deck is in the first raised position and when the support deck is in the first lowered position.

In still a further example, the lift system includes a first lift system supported by the plurality of wheels and a second lift system supported by the first lift system, the first endboard being moveably coupled to the first lift system independent of the second lift system when the support deck is in the first lowered position and moveably coupled to both the first lift system and the second lift system when the support deck is in the first raised position.

In still yet a further example, the first endboard includes at least one recess and the first lift includes an elongated member that engages the recess as the support deck is moved from the first lowered position to the first raised position.

In another example, when the support deck is in the first lowered position, the first endboard may be moved to a raised position without moving the support deck up towards the first raised position.

In a further exemplary embodiment of the present disclosure, a bed adapted to be supported on a floor is provided. The bed comprising a plurality of wheels contacting the floor; a headboard and a footboard, the footboard spaced apart from the headboard, the headboard and the footboard supported by the plurality of wheels; a support deck supported by the plurality of wheels, the support deck including a head end positioned proximate the headboard and a foot end positioned proximate the footboard, and at least one support surface extending between the head end of the support deck and the foot end of the support deck; a lift system supported by the plurality of wheels, the lift system operatively coupled to the support deck to raise and lower the support deck relative to the plurality of wheels, the lift system moves the support deck between a first raised position and a first lowered position, wherein in the first lowered position an upper horizontally extending support surface of the support deck is within about 12 inches of the floor; and a first siderail supported by the plurality of wheels and positioned to a first side of the support deck proximate the headboard, the first side rail extending above the support deck; a second siderail supported by the plurality of wheels and positioned to the first side of the support deck proximate the footboard, the second side rail extending above the support deck; wherein when the support deck is in the first lowered position, the first siderail and the second siderail are moveable between an open configuration and a closed configuration, when the first siderail and the second siderail are in the open configuration both the first siderail and the second siderail are above the support deck and an increased access to the support deck is provided from the first side of the support deck compared to when the first siderail and the second siderail are in the closed configuration.

In an example, the first siderail includes a first side portion facing the headboard in the closed configuration and the second siderail includes a first side portion facing the footboard in the closed configuration, wherein in the open configuration the first side portion of the first siderail is positioned above the support deck and is facing the support deck and the first side portion of the second siderail is positioned above the support deck and is facing the support deck.

In another example, the first siderail is rotatable relative to the support deck and the second siderail is rotatable relative to the support deck.

In a further exemplary embodiment of the present disclosure, a method of controlling a bed adapted to be supported on a floor is provided. The bed including a plurality of wheels, a lift system supported by the plurality of wheels, and a support deck supported by the plurality of wheels. The method comprising the steps of (a) receiving an input requesting a movement of the support deck from a raised position to a lowered position, an upper support surface of the support deck being within 12 inches of the floor when the support deck is in the lowered position; (b) determining if an obstacle is present between the support deck and the floor; and (c) moving the support deck with the lift system to the lowered position if it has been determined that an obstacle is not present between the support deck and the floor.

In an example, the support deck is supported by the lift system through a plurality of load cells and step (b) is performed by monitoring a reported load from the plurality of load cells as the support deck is being lowered and determining the presence of the obstacle due to a change in the reported load from the plurality of load cells.

In yet still a further exemplary embodiment of the present disclosure, a bed adapted to be supported on a floor is provided. The bed comprising a plurality of wheels contacting the floor, each of the plurality of wheels being caster wheels having a first brake configuration wherein a rotation of the wheel relative to the floor is prevented and a second non-brake configuration wherein the rotation of the wheel relative to the floor is permitted, the placement of the caster wheel in either the first brake configuration or the second non-brake configuration is controlled through a rotation of a mechanical input; a support deck supported by the plurality of wheels, the support deck including an at least one support surface extending between a head end of the support deck and a foot end of the support deck; a frame supported by the plurality of wheels, the frame supporting the support deck; and a powered caster wheel control system supported by the frame and operatively coupled to at least a first caster wheel of the plurality of caster wheels. The powered caster wheel control system comprising a linear actuator; and a mechanical linkage driven by the linear actuator and operatively coupled to the mechanical input of the first caster wheel, the mechanical linkage having a first configuration which places the mechanical input in the first brake configuration, a second configuration which places the mechanical input in the second non-brake configuration, and a third neutral configuration.

In an example, the bed further comprises a non-powered caster wheel control system operatively coupled to the mechanical input of the first castor wheel, wherein the mechanical input can be actuated with the non-powered castor wheel control system only when the mechanical linkage of the powered caster wheel control system is in the third neutral configuration. In a variation thereof, the powered castor system is further operatively coupled to the mechanical input of a second caster wheel of the plurality of caster wheels.

In another exemplary embodiment of the present disclosure, a bed adapted to be supported on a floor is provided. The bed comprising a plurality of wheels contacting the floor, each of the plurality of wheels being caster wheels having a first brake configuration wherein a rotation of the wheel relative to the floor is prevented and a second non-brake configuration wherein the rotation of the wheel relative to the floor is permitted, the placement of the caster wheel in either the first brake configuration or the second non-brake configuration is controlled through a rotation of a mechanical input; a support deck supported by the plurality of wheels, the support deck including a at least one support surface extending between a head end of the support deck and a foot end of the support deck; a frame supported by the plurality of wheels, the frame supporting the support deck; a powered caster wheel control system supported by the frame and operatively coupled to the mechanical input of at least a first caster wheel of the plurality of caster wheels; and a non-powered caster wheel control system supported by the frame and operatively coupled to the mechanical input of at least a first caster wheel of the plurality of caster wheels, the non-powered caster wheel control system actuates the mechanical input of the first caster wheel of the plurality of caster wheel independent of the powered caster wheel control system.

In an example, the powered caster wheel control system includes a linear actuator; and a mechanical linkage driven by the linear actuator and operatively coupled to the mechanical input of the first caster wheel, the mechanical linkage having a first configuration which places the mechanical input in the first brake configuration, a second configuration which places the mechanical input in the second non-brake configuration, and a third neutral configuration, wherein the mechanical input can be actuated with the non-powered castor wheel control system only when the mechanical linkage of the powered caster wheel control system is in the third neutral configuration.

Referring to FIG. 1, an exemplary bed 100 is shown. Bed 100 includes a bed frame 102 supported by a plurality of wheels 104 which are supported on a floor 106 of the environment. The bed frame 102 supports a support deck 110 and a plurality of barrier components which form a barrier 112 around the support deck 110. The support deck 110 in turn supports a patient support (not shown).

Exemplary patient supports include mattresses, foam support members, inflatable support members, and other support members that would provide comfort to a patient positioned on the patient support. In one embodiment, the patient support may provide one or more therapies to the patient supported on the patient support. Exemplary therapies include a turning therapy, an alternating pressure therapy, a percussion therapy, a massaging therapy, a low air loss therapy, and other suitable types of therapy. Exemplary patient supports and their operation are provided in U.S. Pat. No. 7,454,809, filed on Dec. 26, 2006, Ser. No. 11/616,127, titled METHOD FOR USING INFLATABLE CUSHION CELL WITH DIAGONAL SEAL STRUCTURE; US Published Patent Application No. 2008/0098532, Ser. No. 11/553,405, filed Oct. 26, 2006, titled MULTI-CHAMBER AIR DISTRIBUTION SUPPORT SURFACE PRODUCT AND METHOD; and U.S. Provisional Patent Application No. 61/713,856, filed Oct. 15, 21012, titled PATIENT SUPPORT APPARATUS AND METHOD, the disclosures of which are expressly incorporated by reference herein.

In the illustrated embodiment, support deck 110 is an expandable support deck as explained herein. In one embodiment, the patient support placed on the support deck is configured to expand and contract with the expansion or contraction of support deck 110.

In the illustrated embodiment, bed frame 102 includes a lift system 120. Lift system 120 is configured to raise and lower support deck 110 relative to the wheels 104 and hence relative to floor 106. In one embodiment, lift system 120 is configured to move support deck 110 between a raised position having a first clearance from the floor and a lowered position having a second clearance from the floor, the second clearance being less than the first clearance. In one example, the first clearance is up to about 34 inches from the floor and the second clearance is up to about 12 inches from the floor. In another example, the first clearance is up to about 34 inches from the floor and the second clearance is up to about 10 inches from the floor. In a further example, the first clearance is at least about 34 inches from the floor and the second clearance is up to about 8 inches from the floor. In a still further example, the first clearance is at least 34 inches from the floor and the second clearance is up to about 6 inches from the floor. In yet still a further example, the first clearance is at least 34 inches from the floor and the second clearance is up to about 7 inches from the floor. In still another example, the first clearance is at least 34 inches from the floor and the second clearance is generally equal to a diameter of the plurality of wheels 104. In yet still a further example, the first clearance is up to about 30 inches from the floor and the second clearance is up to about 6 inches from the floor. In one embodiment, in all of the examples provided above, the bed frame 102 remains spaced apart from floor 106 when the support deck is in the lowered position thus permitting bed 100 to be moveable relative to floor 106.

Figure 2:
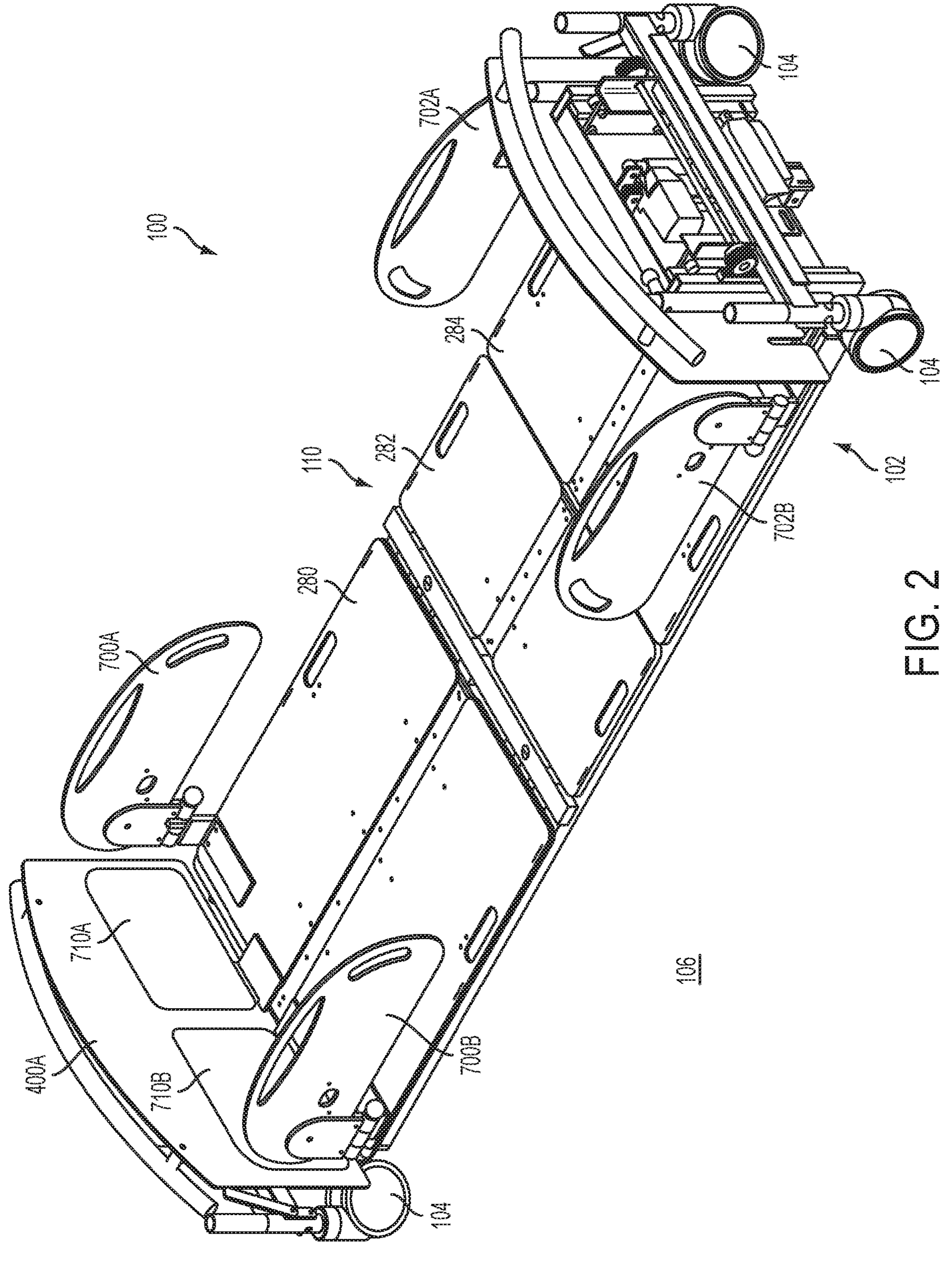
FIG. 2 illustrates a perspective view of the bed of FIG. 1 with the support deck being shown in a lowered position.

FIG. 1 illustrates bed 100 in an exemplary raised position and FIG. 2 illustrates bed 100 in an exemplary lowered position. As explained in more detail herein, the support deck 110 of bed 100 is an articulating support deck and an expandable support deck. The support deck 110 retains both its ability to articulate and expand when bed 100 is in the lowered position.

Figure 3:
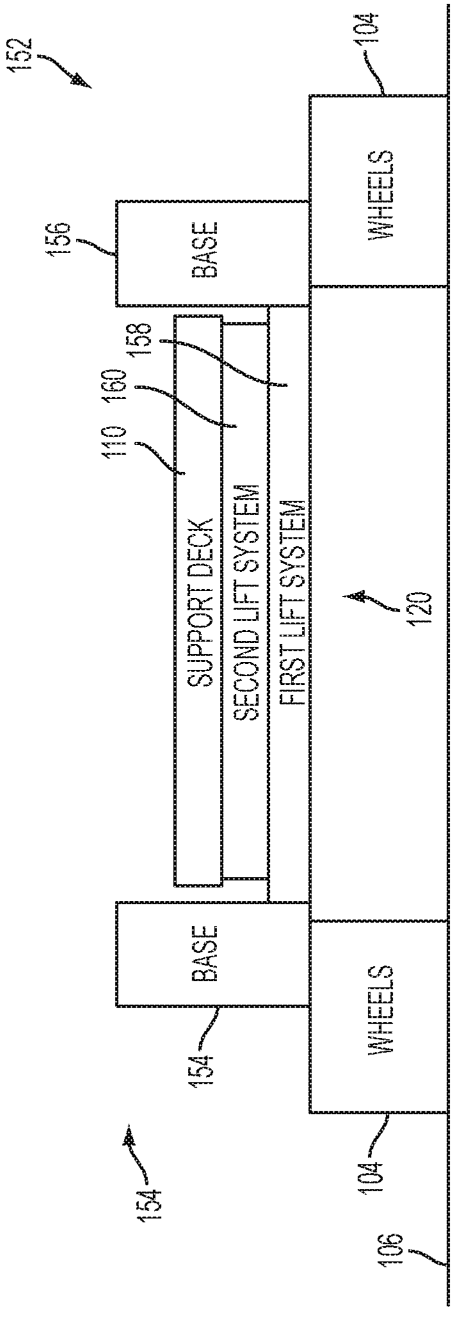
FIG. 3 illustrates a respective view of the components of the bed of FIG. 1.

Referring to FIG. 3, an exemplary representation of bed 100 is shown. Bed 100 includes a head end 150 and a foot end 152. The plurality of wheels 104 sit on the floor 106. A head end set of wheels 104 supports a first base 154 and a foot end set of wheels 104 supports a second base 156. Lift system 120 includes a plurality of lift systems. A first lift system 158 is coupled to base 154 on a head end of first lift system 158 and to base 156 on a foot end of first lift system 158. A second lift system 160 is coupled to first lift system 158. Support deck 110 is supported by second lift system 160. In operation, each of first lift system 158 and second lift system 160 may be individually actuatable. As such, first lift system 158 may be actuated to raise or lower support deck 110 while second lift system 160 remains static, but is also being raised or lowered. Further, second lift system 160 may be actuated to raise or lower support deck 110 while first lift system 158 remains static. In addition, both first lift system 158 and second lift system 160 may both be actuated simultaneously to raise or lower support deck 110.

Figure 4:
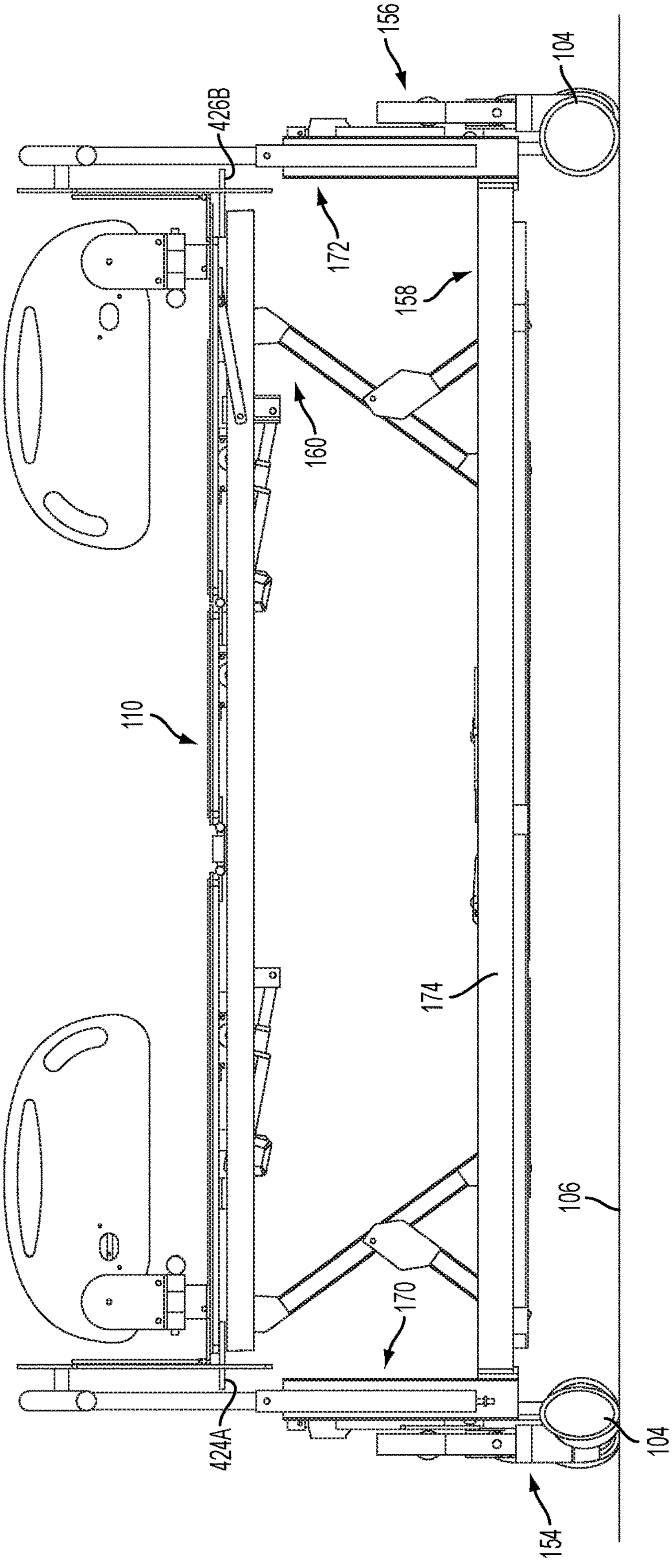
FIG. 4 illustrates a side view of the bed of FIG. 1 with the support deck in the raised position as in FIG. 1.
Figure 6:
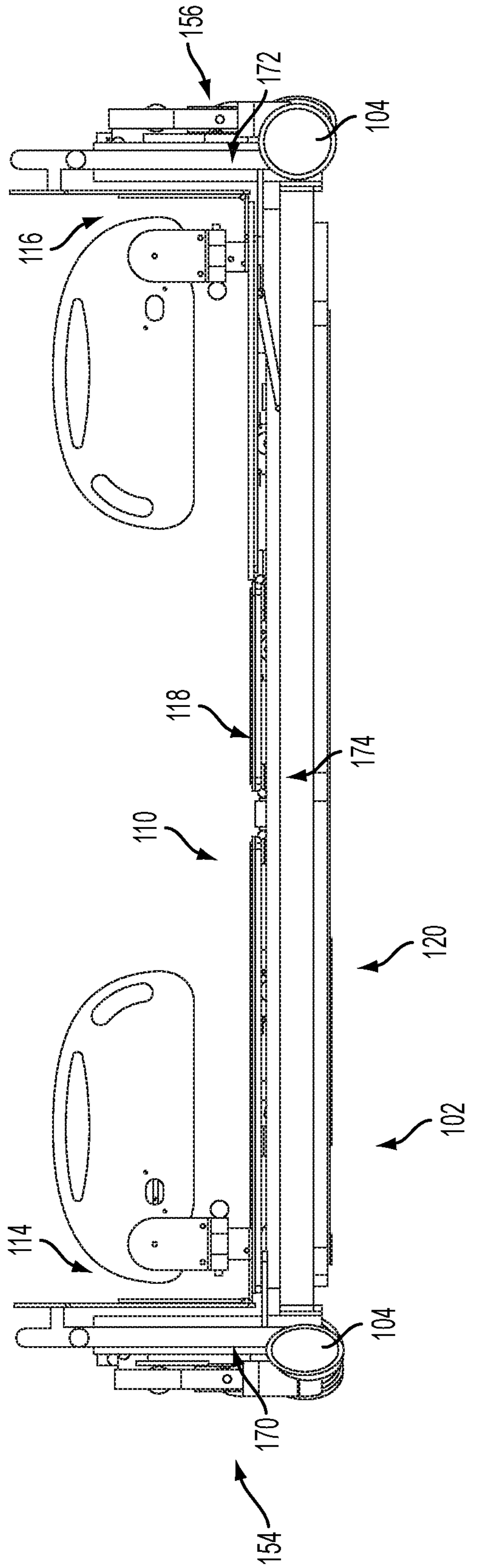
FIG. 6 illustrates a side view of the bed of FIG. 1 with the support deck in the lowered position as in FIG. 2.

Referring to FIG. 4, bed 100 is shown in the raised position of FIG. 1. In the illustrated embodiment, first lift system 158 includes a head end base 170, a foot end base 172, and a middle portion 174 extending between head end base 170 and foot end base 172. As shown by a comparison of FIGS. 4 and 6, head end base 170 may be raised or lowered relative to first base 154 and foot end base 172 may be raised or lowered relative to second base 156. In FIGS. 3 and 6, head end base 170 and foot end base 172 are both raised or lowered relative to their respective first base 154 and second base 156 together resulting in a head end 114 of support deck 110 and a foot end 116 of support deck 110 remaining generally even such that an upper support surface 118 of support deck 110 remains generally horizontal.

Figure 7:
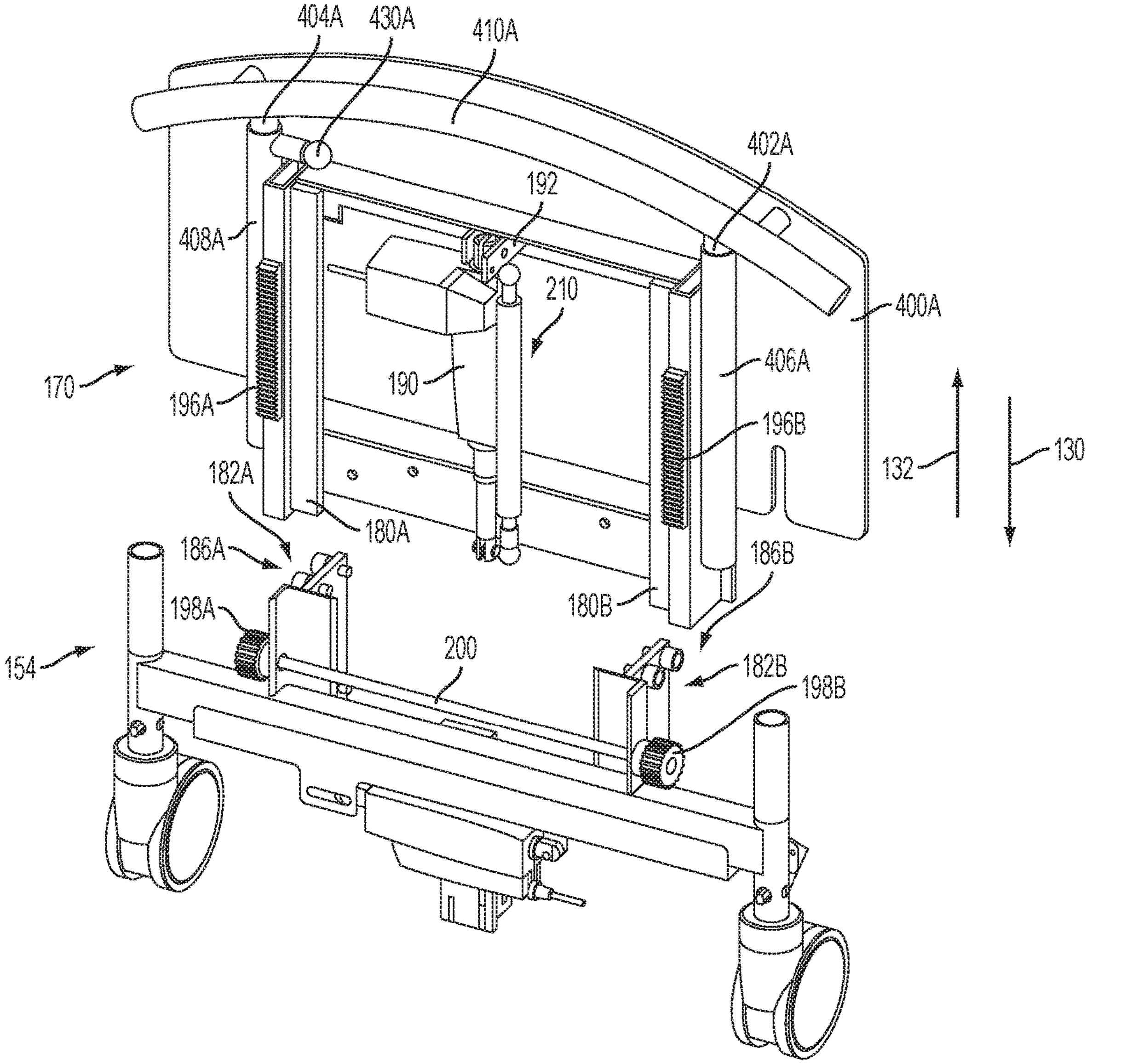
FIG. 7 illustrates a perspective view of a head end portion of the bed of FIG. 1 illustrating a first base of the frame of the bed and a head end portion of a first lift system of the bed, the first lift system being disassembled from the first base.

Referring to FIGS. 5 and 7-9, the connection between first base 154 and head end base 170 is shown. Referring to FIG. 7, head end base 170 includes rails 180A, 180B which are received in respective channels 182A, 182B of first base 154. The channels 182A, 182B includes rollers 186A, 186B. The interaction between rails 180A, 180B and the respective channels 182A, 182B generally limits the movement of head end base 170 relative to first base 154 in direction 130 and direction 132.

Figure 5:
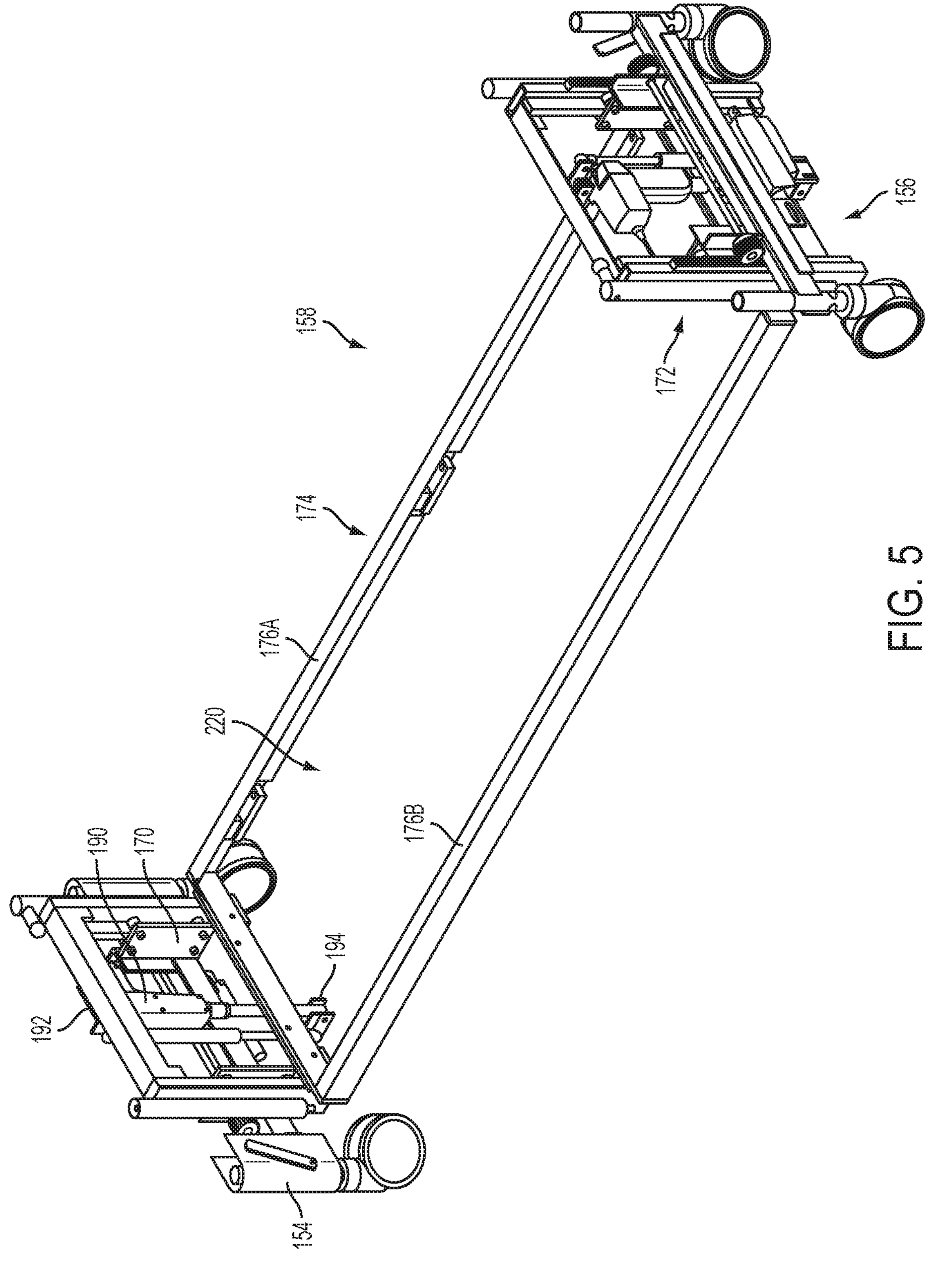
FIG. 5 is a perspective view of a first lift system of the bed of FIG. 1.

A linear actuator 190 is coupled to head end base 170 at bracket 192 and first base 154 at bracket 194 (see FIG. 5). Linear actuator 190 is mounted generally vertical to increase its vertical lifting force without the use of levers. To compensate for off center loading of support deck 110 and to maintain an orientation of head end base 170 relative to first base 154, head end base 170 includes rack gears 196A, 196B which interact with respective pinion gears 198A, 198B of first base 154. Pinion gears 198A, 198B are coupled together through an axle 200 which keeps pinion gears 198A, 198B rotating at the same rate and in turn keeps head end base 170 aligned with first base 154.

Referring to FIG. 7, in one embodiment, a gas spring 210 is included to assist in raising head end base 170 relative to first base 154. A first end of gas spring 210 is coupled to head end base 170 and a second end of gas spring 210 is coupled to first base 154. Gas spring 210 is compressed when head end base 170 is moved in direction 130 and assists in lifting head end base 170 in direction 132 when head end base 170 is being raised. Gas spring 210 also reduces the speed at which support deck 110 moves in direction 130 in case of failure of the actuator.

Figure 8:
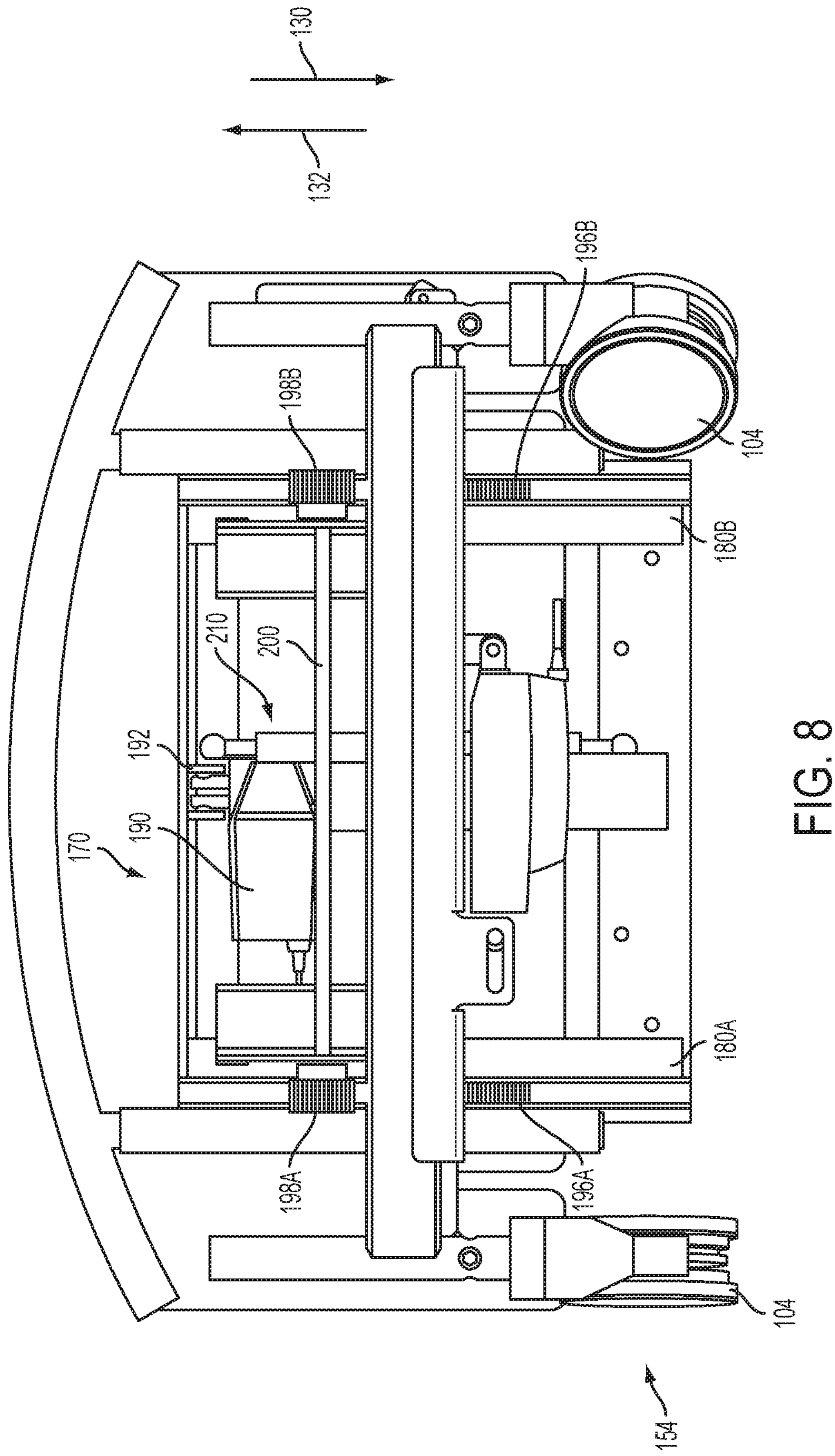
FIG. 8 illustrates a head end view of the assembly of FIG. 7 with the head end portion of the first lift system coupled to the first base and the head end portion of the first lift system being in the lowered position shown in FIG. 2.
Figure 9:
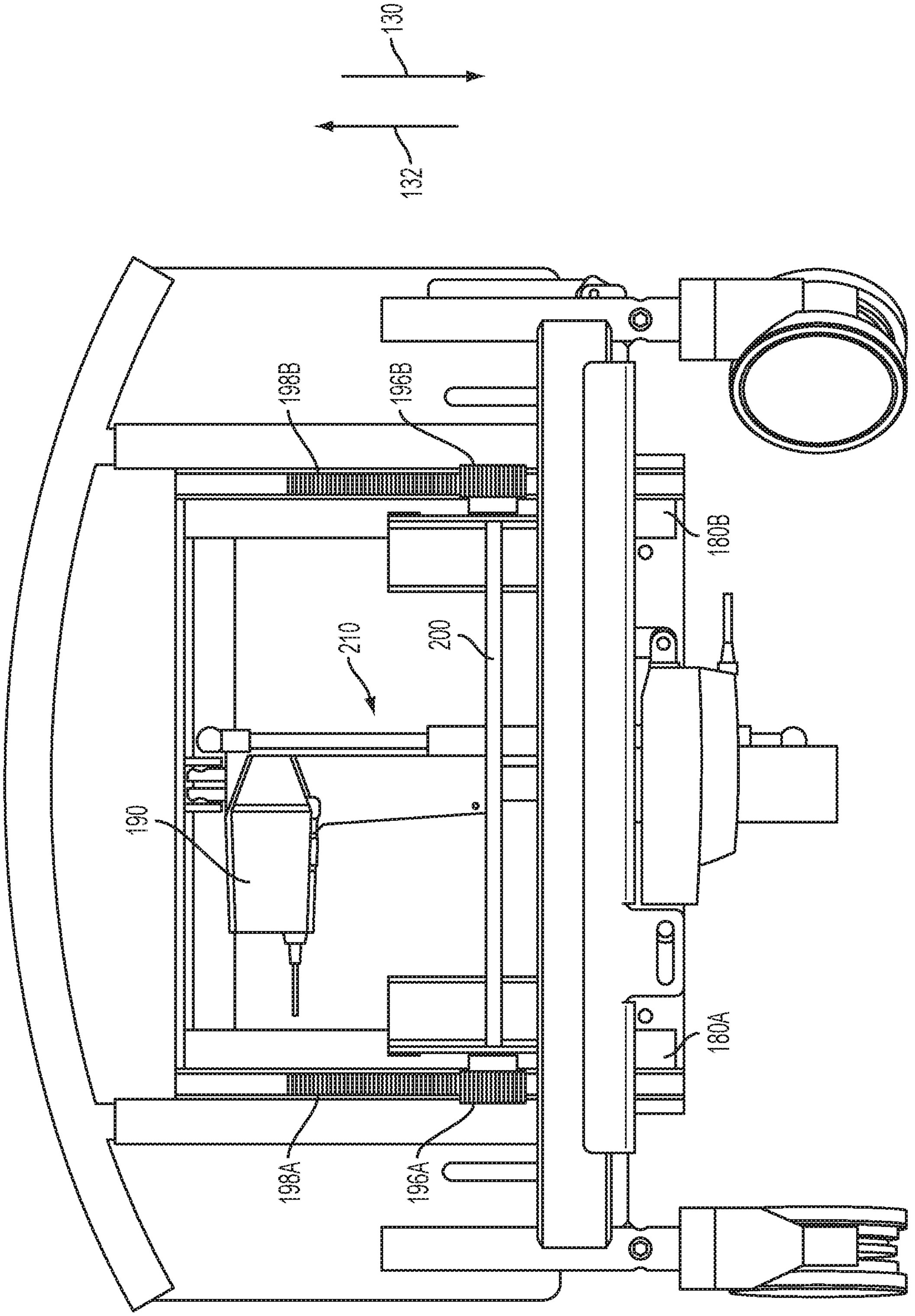
FIG. 9 illustrates a head end view of the assembly of FIG. 7 with the head end portion of the first lift system coupled to the first base and the head end portion of the first lift system being in the raised position shown in FIG. 1.

Referring to FIG. 8, head end base 170 is lowered in direction 130 relative to first base 154. Referring to FIG. 9, head end base 170 is raised in direction 132 relative to first base 154. As shown in FIGS. 8 and 9, linear actuator 190 is centered between racks 196A, 196B. Although a single linear actuator 190 is shown, multiple linear actuators 190 may be used to increase the lifting force in direction 132. If multiple linear actuators 190 are included, the linear actuators 190 may replace the rack and pinion arrangement. However, the multiple linear actuators 190 would require synchronizing when expanding or retracting.

As mentioned herein, by incorporating the rack and pinion arrangement, the stability of bed 100 is increased. The pinion gears 198A, 198B are fixed to axle 200 which is mounted horizontally across first base 154. The pinion gears 198A, 198B ride up in direction 132 and/or down in direction 130 relative gear racks 196A, 196B that are mounted vertically to vertical portions of head end base 170. When a load upon support deck 110 is off center the load is evenly distributed and/or balanced across the pinion gear axle 200 from one pinion gear 198 to the other pinion gear 198 maintaining the parallelism of first base 154 and head end base 170. foot end base 172 and second base 156 are connected further a rack and pinion arrangement like head end base 170 and first base 154 and is driven by a linear actuator like head end base 170 and first base 154.

Figure 10:
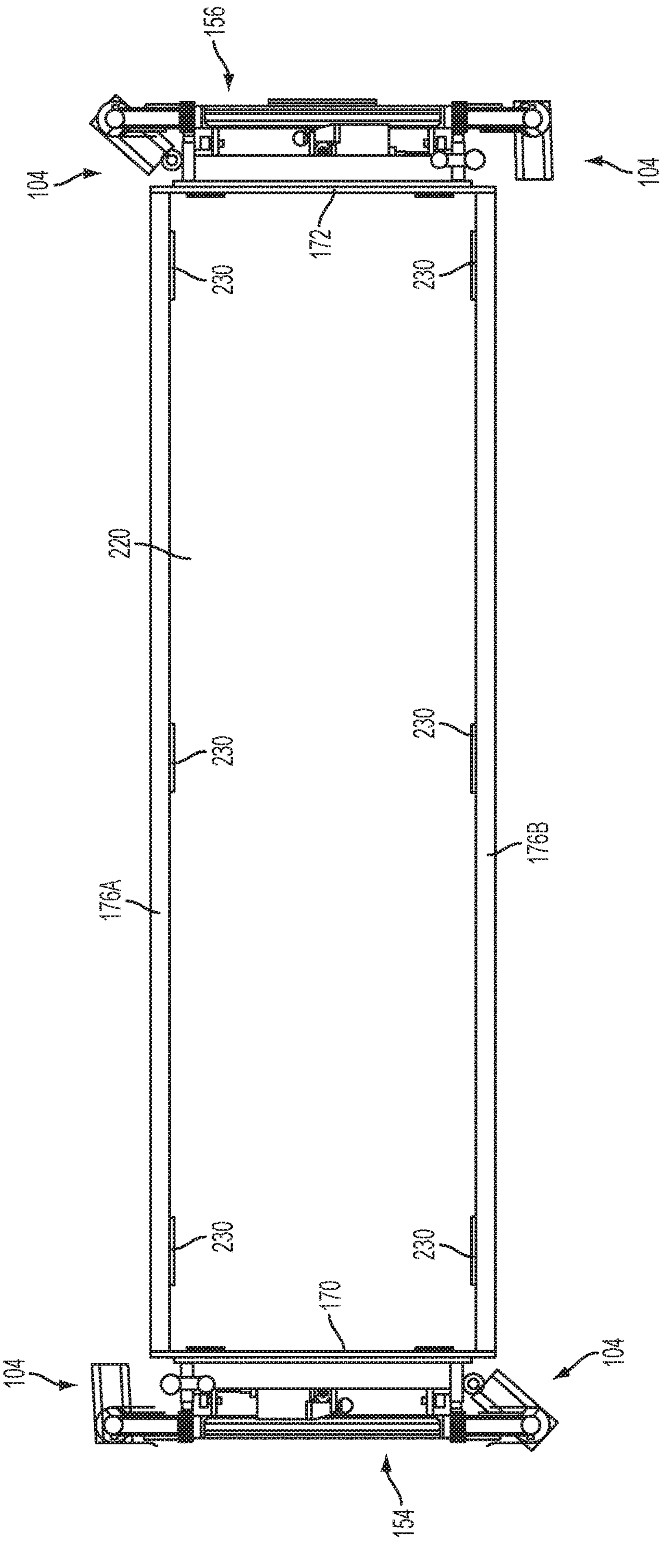
FIG. 10 illustrates a top view of the first lift system of FIG. 5.

Referring to FIG. 5, middle portion 174 includes two horizontally extending members 176A, 176B that are coupled to head end base 170 at a head end and are coupled to foot end base 172 at a foot end. Head end base 170, member 176A, foot end base 172, and member 176B bound an open area 220 in first lift system 158. As shown in FIG. 10, the open area 220 is generally rectangular in shape.

First lift system 158 supports a plurality of load cells 230. Six load cells 230 are illustrated. More or fewer load cells 230 may be used. An exemplary load cell is a BK2 500 kg load cell available from Flintec Load Cells located at 18A Kane Industrial Drive in Hudson, Mass. 01749.

Second lift system 160 is also coupled to load cells 230. Second lift system 160 is coupled to first lift system 158 through load cells 230. As mentioned herein, support deck 110 is supported by second lift system 160. As such, by monitoring the load cells 230, a weight of second lift system 160, support deck 110, and items supported on support deck 110 may be determined as is known in the art.

Figure 11:
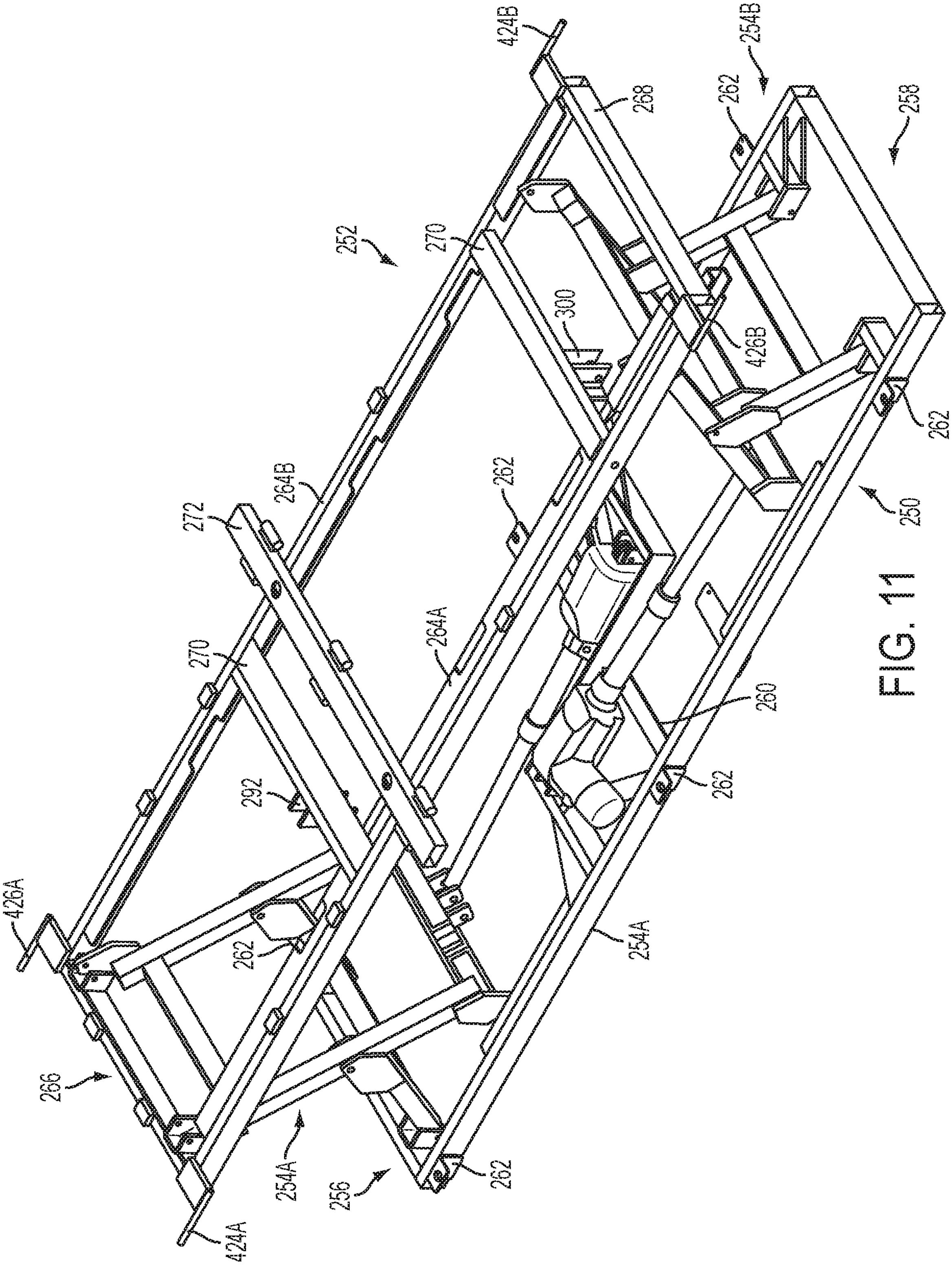
FIG. 11 illustrates a perspective view of a second lift system of the bed with the second lift system in the raised configuration shown in FIG. 1.
Figure 12:
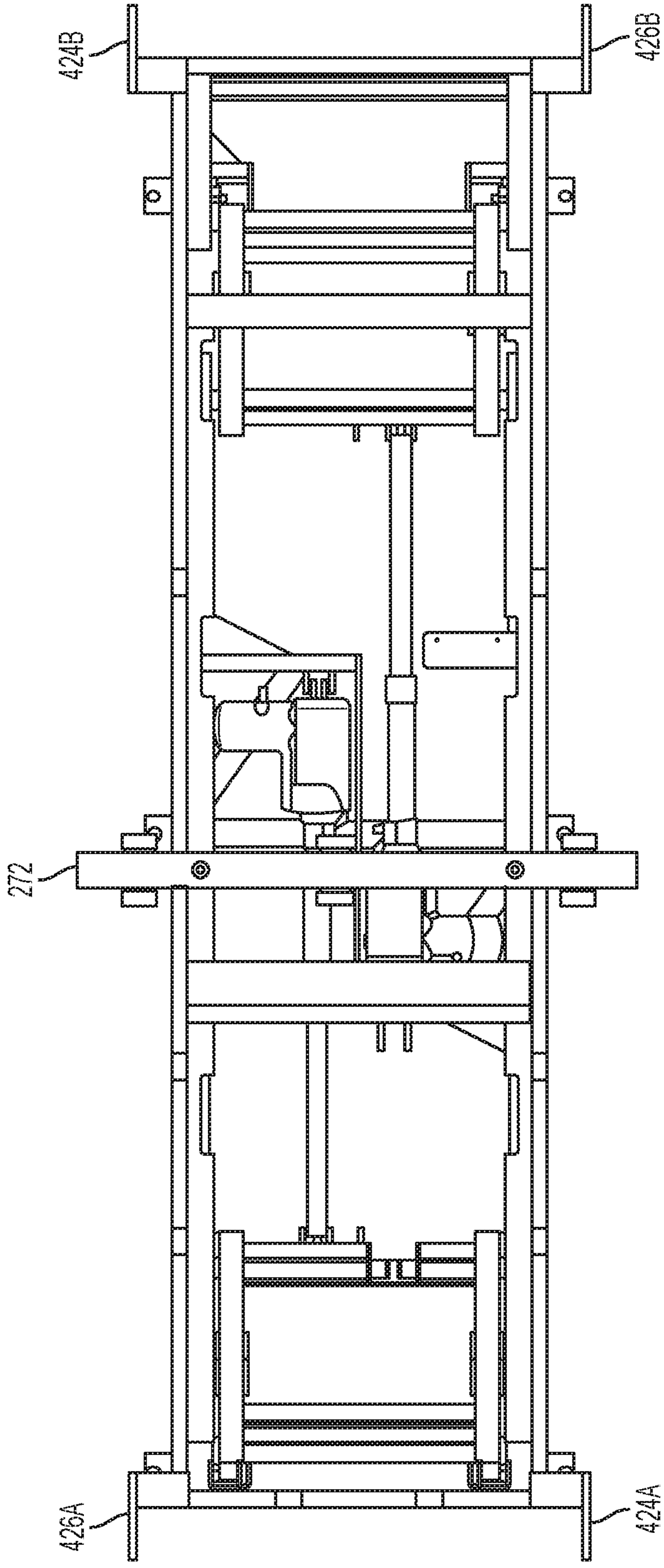
FIG. 12 illustrates a top view of the second lift system in the raised configuration of FIG. 11.
Figure 13:
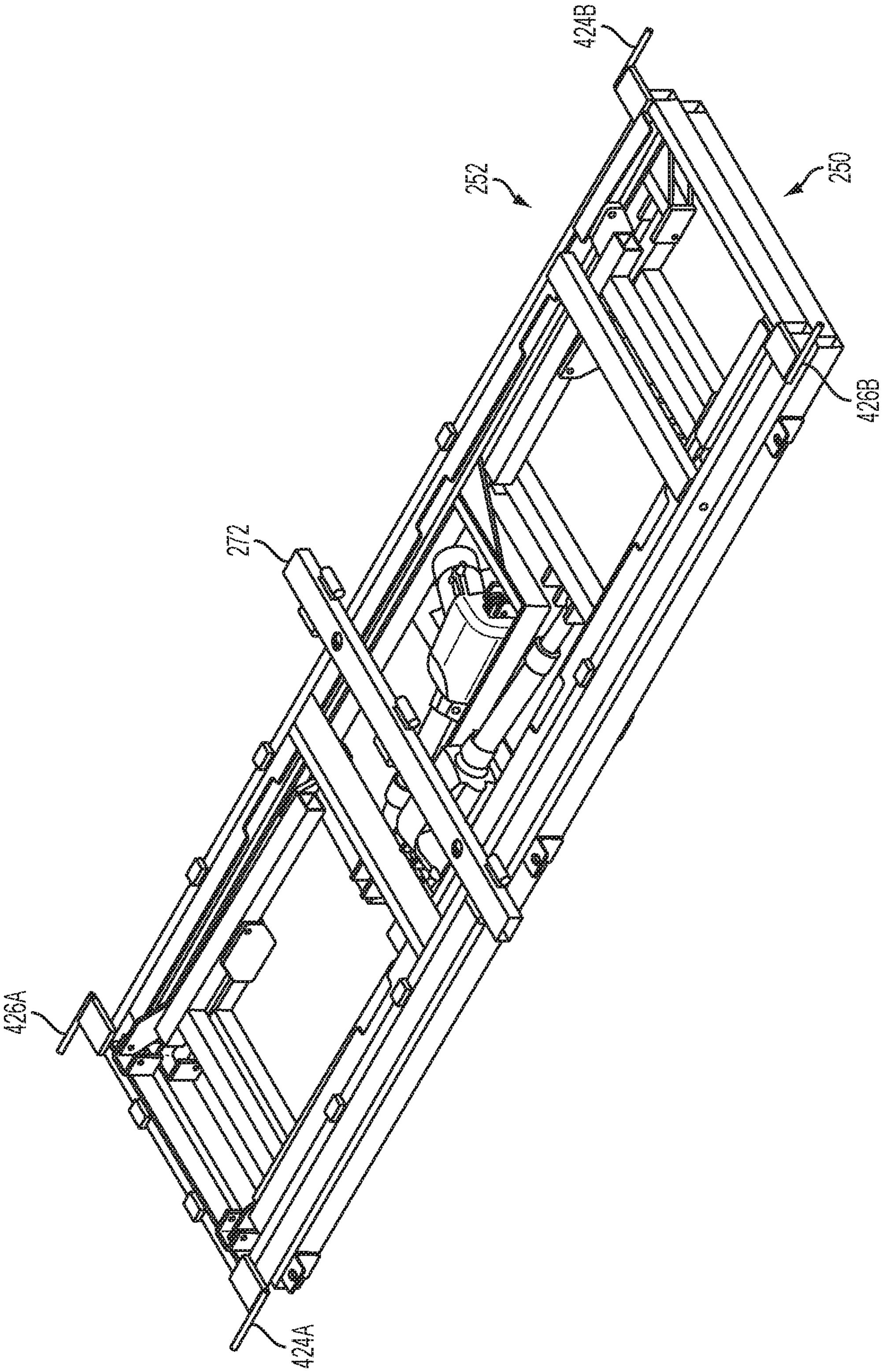
FIG. 13 illustrates a perspective view of a second lift system of the bed with the second lift system in the lowered configuration shown in FIG. 2.
Figure 14:
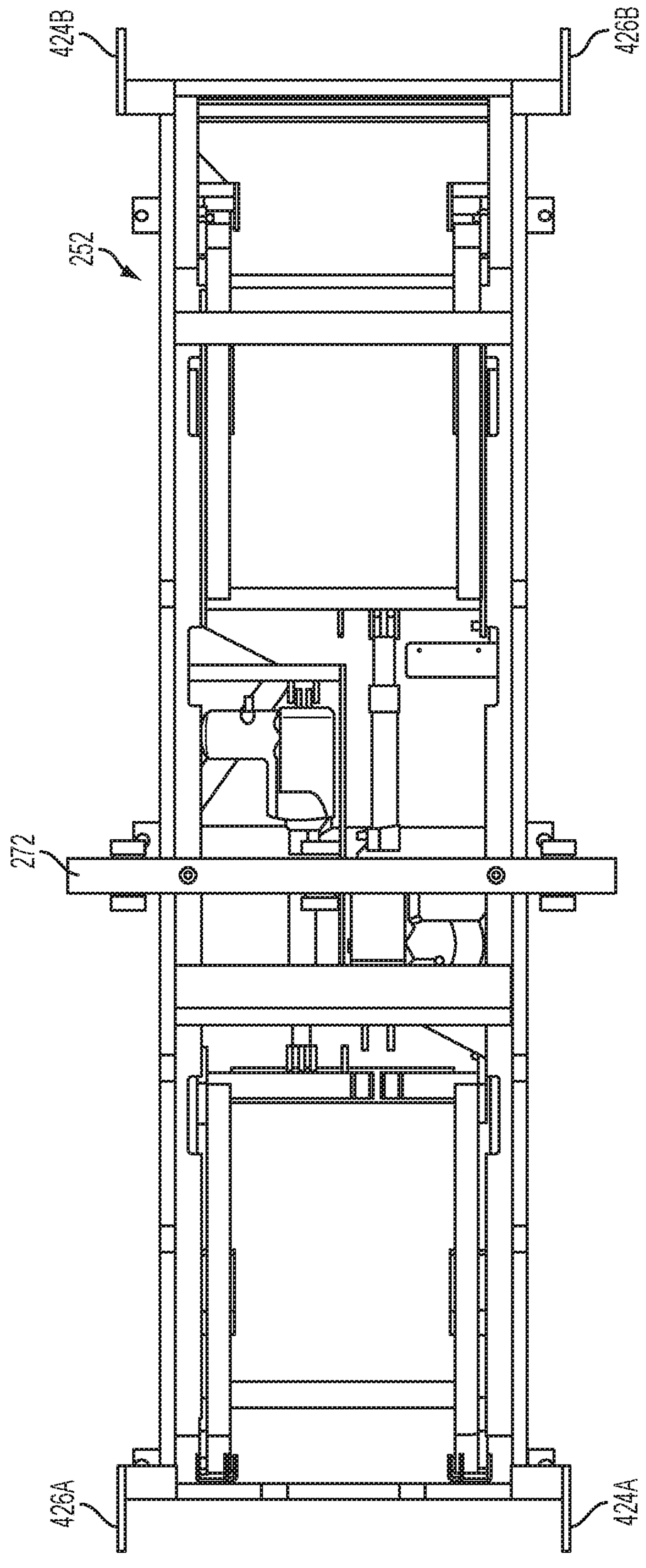
FIG. 14 illustrates a top view of the second lift system in the lowered configuration of FIG. 13.

Referring to FIGS. 11 and 12, an exemplary embodiment of second lift system 160 is shown in a first raised configuration. The illustrated embodiment of second lift system 160 is also shown in FIGS. 13 and 14 in a first lowered configuration.

Returning to FIG. 11, second lift system 160 includes a lower frame 250, an upper frame 252 and lifting assemblies 254A, 254B. Lower frame 250 includes a pair of longitudinally extending members 254A, 254B which extend from a head end to a foot end. Lower frame 250 further includes a head end cross member 256, a foot end cross member 258, and a mid cross member 260. Lower frame 250 further includes a plurality of brackets 262 which couple second lift system 160 to load cells 230.

Upper frame 252 includes a pair of longitudinally extending members 264A, 264B which extend from a head end to a foot end. Upper frame 252 further includes a head end cross member 266, a foot end cross member 268, and a plurality of mid cross members 270. Upper frame 252 further includes a cross member 272 which is pivotally coupled to support deck 110.

Figure 15:
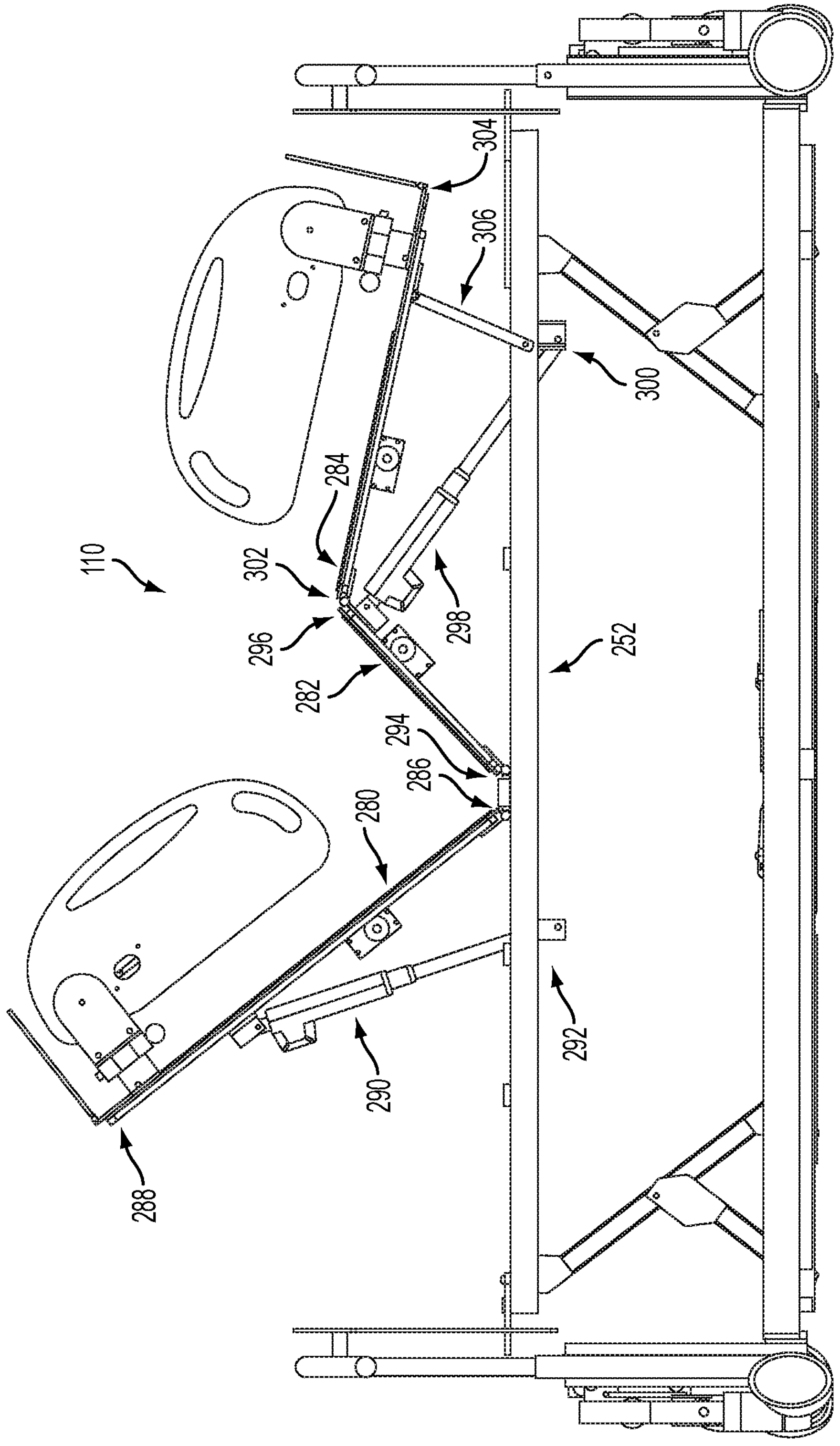
FIG. 15 illustrates the side view of the bed in FIG. 4 with the support deck articulated in a non-horizontal configuration.

As shown in FIG. 15, support deck 110 includes a plurality of sections which may be articulated relative to upper frame 252. Support deck 110, in the illustrated embodiment, includes a head section 280, a seat section 282, and a foot section 284. Head section 280 is pivotally coupled to cross member 272 at a first end 286. A second end 288 of head section 280 is raised relative to first end 286 with a linear actuator 290 pivotally coupled to head section 280 and pivotally coupled to a bracket 292 on upper frame 252. Seat section 282 is pivotally coupled to cross member 272 at a first end 294. A second end 296 of seat section 282 is raised relative to first end 294 with a linear actuator 298 pivotally coupled to seat section 282 and pivotally coupled to a bracket 300 on upper frame 252. Leg section 284 is pivotally coupled to seat section 282 at a first end 302. A second end 304 of leg section 284 is pivotally coupled to upper frame 252 through a link 306. Exemplary linear actuators 290 and 298 are LA31 available from Linak U.S. Inc. located at 2200 Stanley Gault Parkway in Louisville Ky. 40223.

Figure 19:
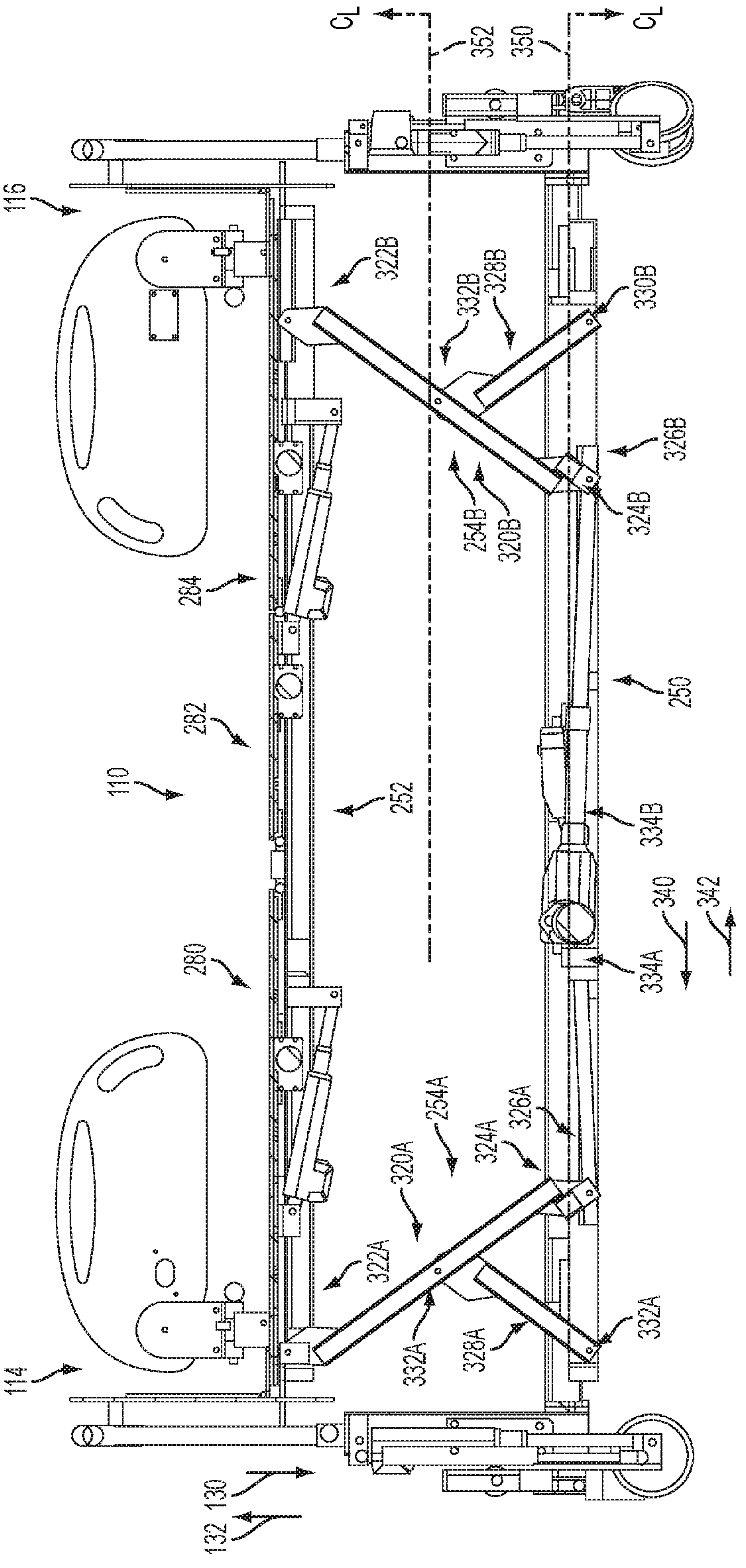
FIG. 19 is a sectional view of the bed along lines 19-19 in FIG. 18.

In the illustrated embodiment, lifting assemblies 254A, 254B are generally identical. Referring to FIG. 19, lifting assembly 254A is a scissor jack assembly. lifting assembly 254A includes a first leg 320A pivotally coupled to upper frame 252 on a first end 322A and both pivotally and slidably coupled to lower frame 250 on a second end 324A. The second end 324A of first leg 320A includes a member that cooperates with guide 326A to permit second end 324A to move horizontally in direction 340 and in direction 342. An exemplary member is a roller received in a guide channel. Lifting assembly 254A further includes a second leg 328A pivotally coupled to lower frame 250 on a first end 330A and pivotally coupled to first leg 320A on a second end 332.

The second end 324A of first leg 320A is coupled to a linear actuator 334A. Exemplary linear actuators 290 and 298 are LA34 available from Linak U.S. Inc. located at 2200 Stanley Gault Parkway in Louisville Ky. 40223. The linear actuator 334A may be actuated to move second end 324A in direction 340 to raise head end 114 of support deck 110 in direction 132 and may be actuated to move second end 324A in direction 342 to lower head end 114 of support deck 110 in direction 130.

Figure 20:
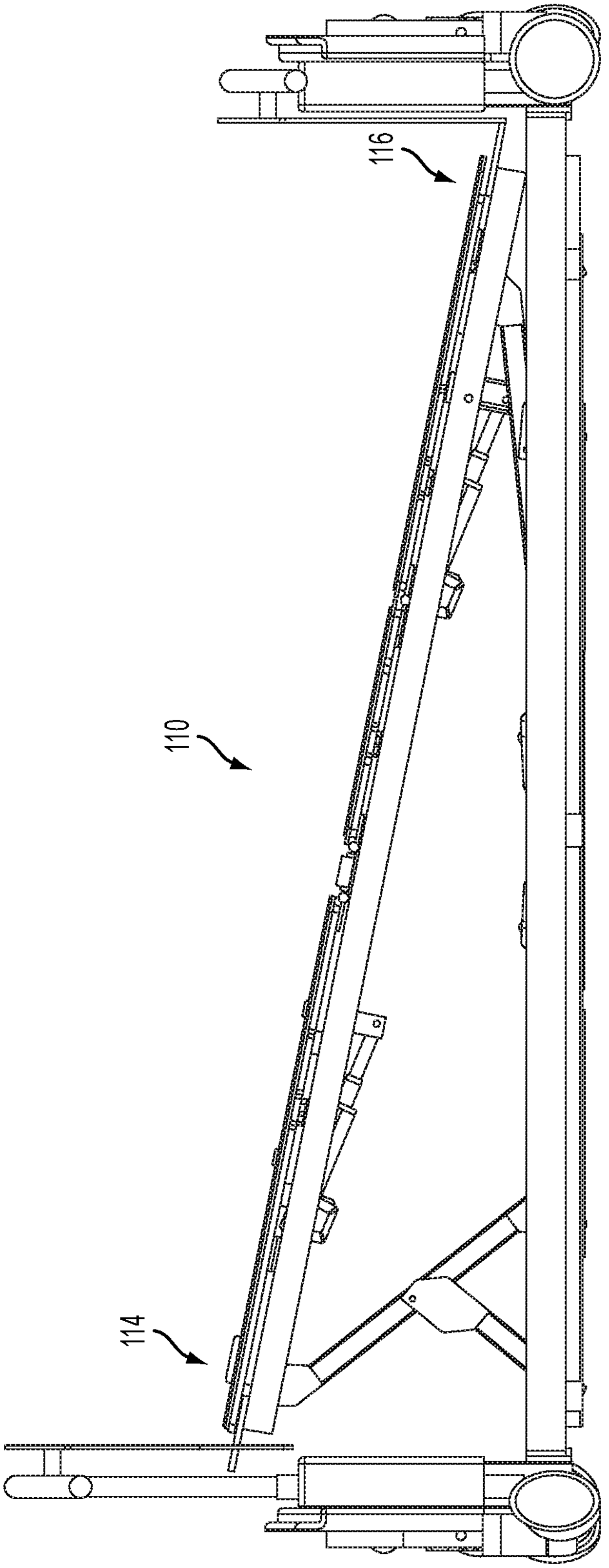
FIG. 20 is a side view of the bed of FIG. 1 wherein a foot end of the support deck is lowered relative to a head end of the support deck.

In a similar manner linear actuator 334B may be actuated to move second end 324B in direction 342 to raise foot end 116 of support deck 110 in direction 132 and may be actuated to move second end 324B in direction 340 to lower foot end 116 of support deck 110 in direction 130. Referring to FIG. 4, lifting assembly 254A and lifting assembly 254B are actuated to raise both head end 114 of support deck 110 and foot end 116 of support deck 110. Referring to FIG. 20, lifting assembly 254B is actuated to lower foot end 116 of support deck 110.

Figure 17:
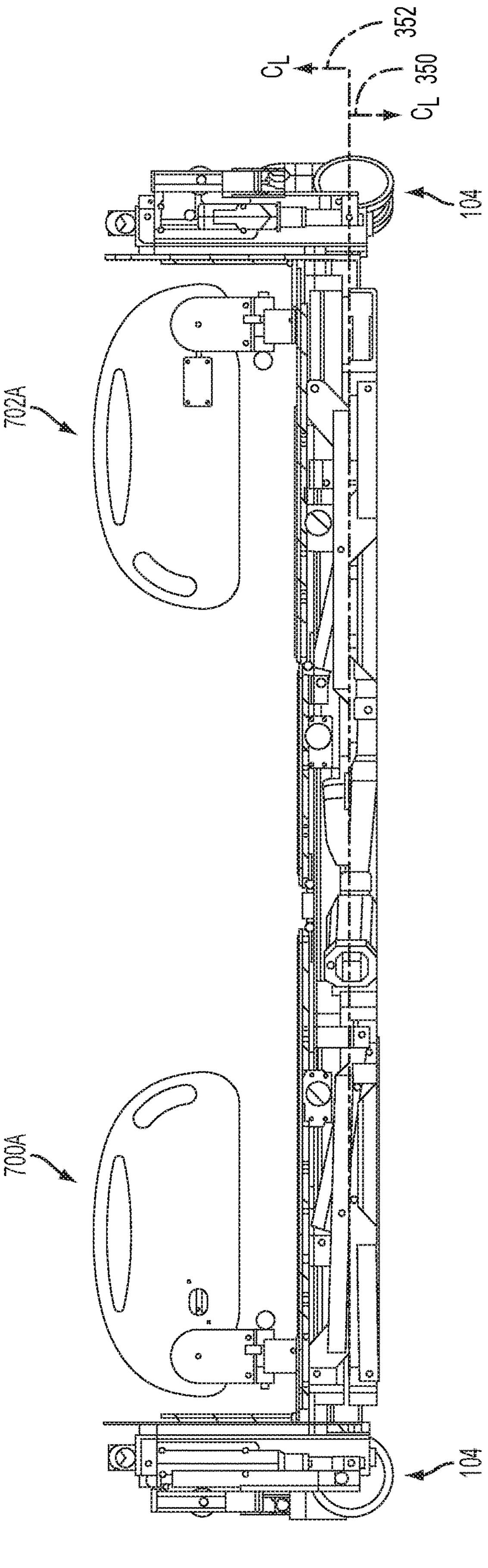
FIG. 17 is a sectional view of the bed along lines 17-17 in FIG. 16.

Referring to FIG. 17, in the illustrated embodiment, second lift system 160 is sized to nest within open area 220 of first lift system 158. Referring to FIG. 19, when linear actuators 334A, 334B are fully extended a horizontal centerline 350 of middle portion 174 of first lift system 158 is located midway between an upper surface of longitudinally extend member and a lower surface of longitudinally extend member. Second lift system 160 includes a horizontal centerline 352 located midway between an upper surface upper frame 252 and a lower surface of lower frame 250. When support deck 110 is in a first raised position the horizontal centerline 352 of the second lift system 160 is positioned above the horizontal centerline 350 of the first lift system 158. When support deck 110 is in a first lowered position the horizontal centerline 352 of the second lift system 160 is generally aligned with the horizontal centerline 350 of the first lift system 158 as shown in FIG. 17.

Referring to FIG. 7, a barrier component, illustratively an endboard 400A, is shown. A similar endboard is provided with respective to end base 172. Exemplary endboards include headboards (endboard 400A) and footboards (endboard 400B). Endboard 400A includes a push bar 410A coupled to a side of endboard 400A facing away from support deck 110A. Push bar 410A has a first downward extending tube 402A and a second downward extending tube 404A which are received in a respective tube 406A and tube 408A of head end base 170. As such, endboard 400A is coupled to first lift system 158 and is raised when first lift system 158 is raised.

Figure 21:
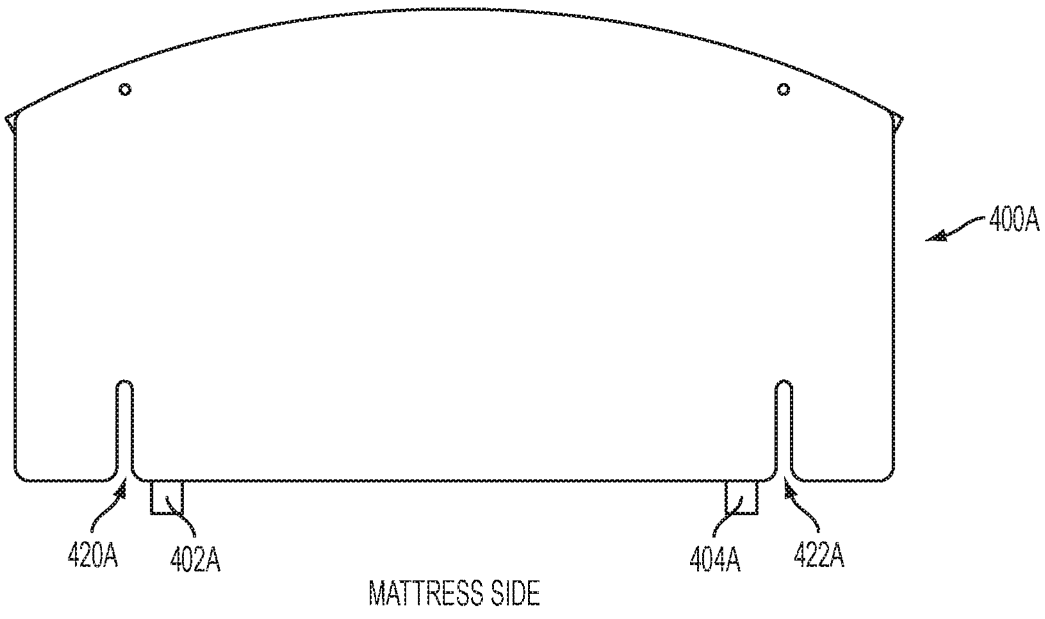
FIG. 21 is an end view of the headboard of the bed of FIG. 1.
Figure 22:
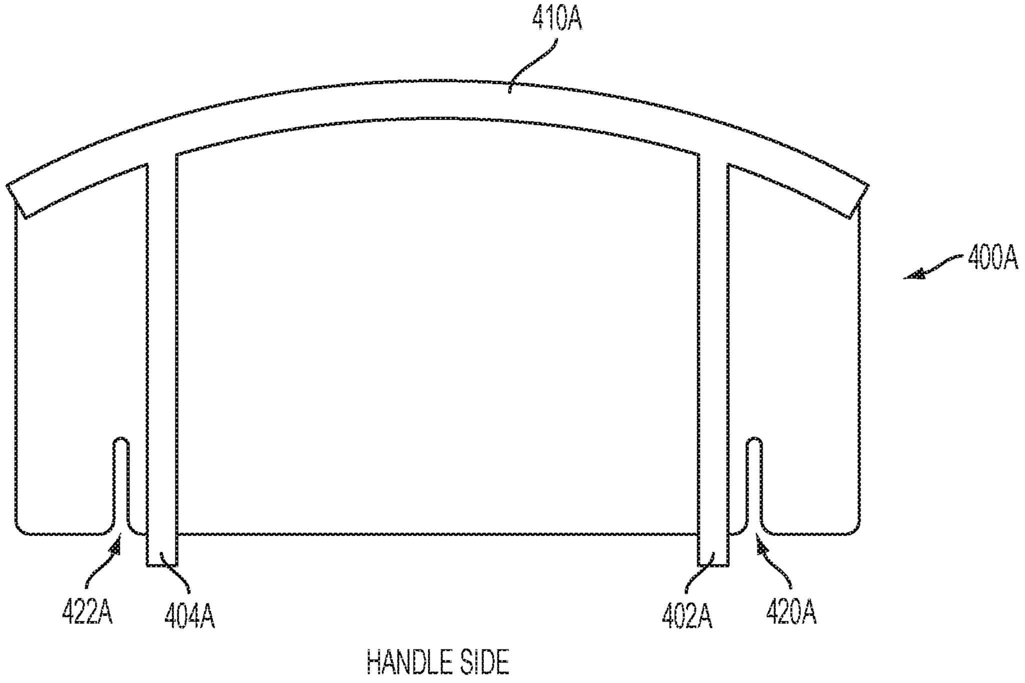
FIG. 22 is a second end view of the headboard of the bed of FIG. 1.

As explained herein, when support deck 110 is in the first raised position of FIG. 1, endboard 400A is coupled to second lift system 160 to move with the support deck 110 and when support deck 110 is in the first lowered position of FIG. 2 endboard 400A is uncoupled from second lift system 160 resulting in support deck 110 moving independently of endboard 400A Referring to FIGS. 21 and 22, endboard 400A includes a first lower recess 420A and a second lower recess 422A. Referring to FIG. 11, upper frame 252 includes a first pin 424A and a second pin 426A, each extending from upper frame 252 towards head end base 170 (see FIG. 4). Pin 424A is spaced apart from recess 420A and pin 426A is spaced apart from recess 422A when first lift system 158 is in the raised position and second lift system 160 is in the lowered position. As second lift system 160 is moved to the raised position, pin 424A is received in recess 420A and pin 426A is received in recess 422A, coupling endboard 400A with second lift system 160.

When both first lift system 158 and second lift system 160 are in the lowered position (see FIG. 6) push bar 410A is low and an operator would likely need to bend over to push bed 100. Referring to FIG. 7, tube 402A is slidable within tube 406A and tube 404A is slidable within tube 408A. As such, push bar 410A may be raised in direction 132 to raise a height of push bar 410A. In one embodiment, a retainer 430A secures push bar 410A relative to head end base 170. An exemplary retainer is a spring loaded pin that is received in apertures in tube 408A. In operation, retainer 430A is retracted, push bar 410A is raised in direction 132, and retainer 430A is passed into an aperture in tube 408A to hold a position of push bar 410A relative to head end base 170.

Figure 16:
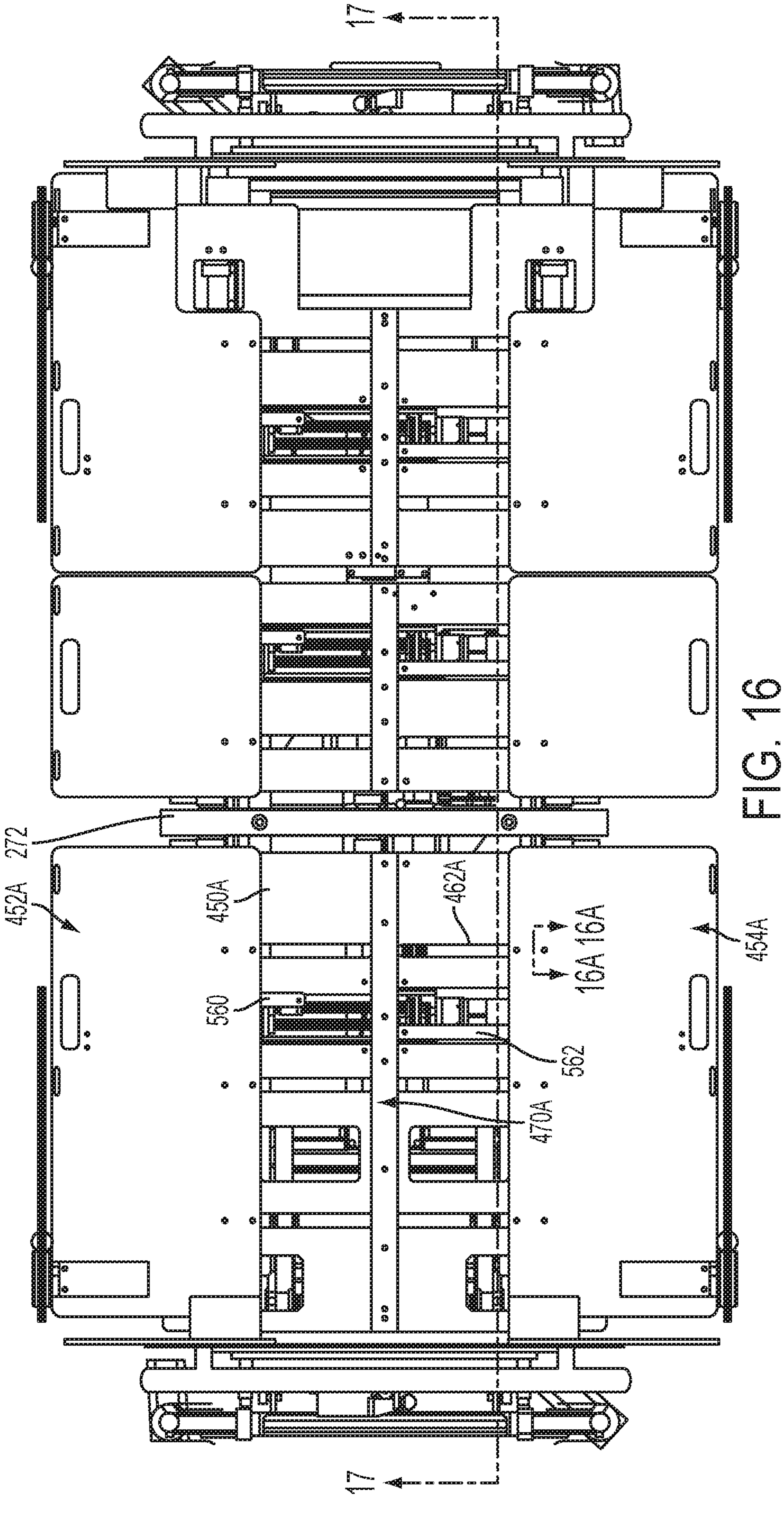
FIG. 16 illustrates a top view of the bed in the configuration of FIG. 2 and with the support deck in an expanded configuration.
Figure 18:
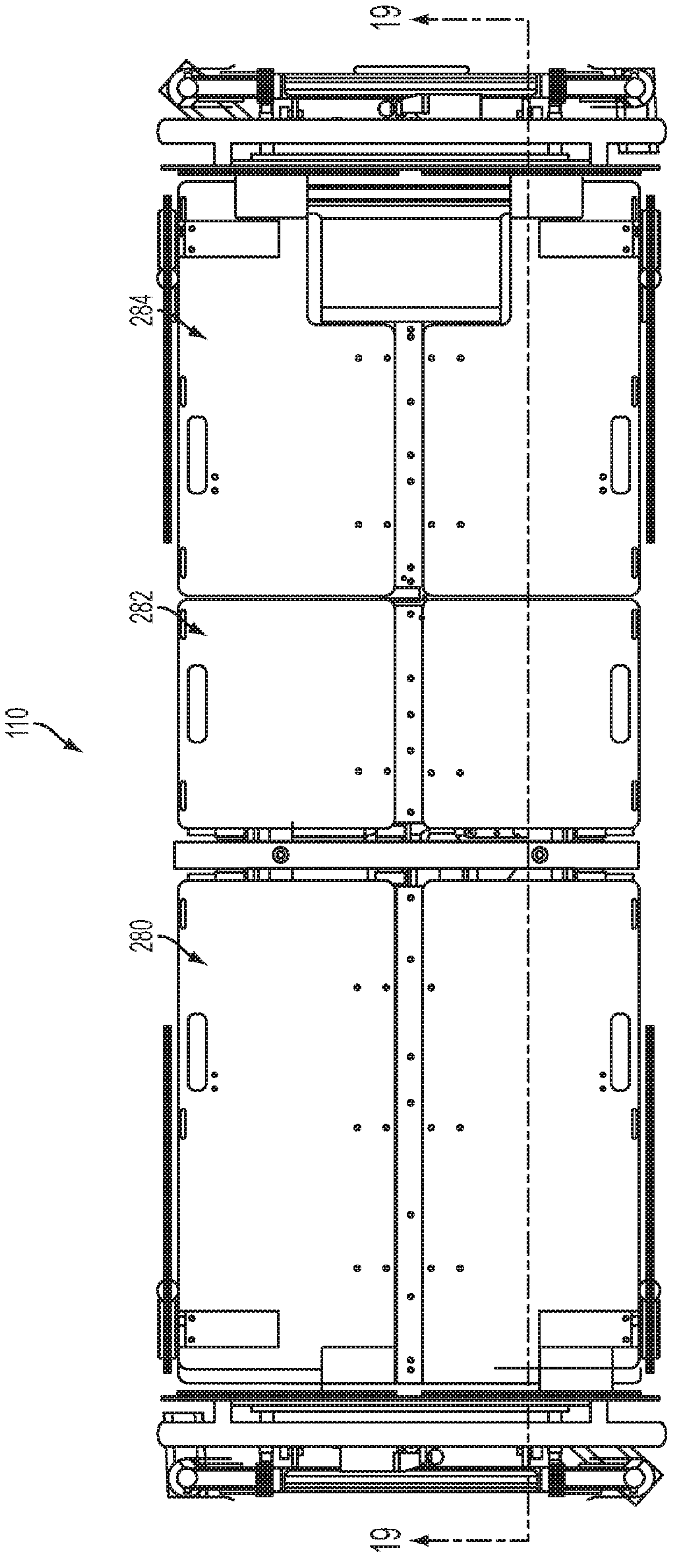
FIG. 18 illustrates a top view of the bed in the configuration of FIG. 1 and with the support deck in a retracted configuration.

As mentioned herein, support deck 110 is an expandable support deck 110. In one embodiment, support deck 110 can expand transversely between a width of about 34 inches to a width of about 48 inches. Referring to FIG. 18, support deck 110 is shown in a retracted configuration having a width of 34 inches. Referring to FIG. 16, support deck 110 is shown in an expanded configuration having a width of about 48 inches. As shown by a comparison of FIGS. 16 and 18, support deck 110 has a first area in FIG. 16 and a second area in FIG. 18, the second area being larger than the first area. Each of head section 280, seat section 282, and section 284 are individually controlled to expand and retract. As such, each of head section 280, seat section 282, and section 284 may be adjusted to different widths, if desired.

The operation of each of head section 280, seat section 282, and section 284 is generally identical. The following discussion related to head section 280 is therefore representative of the operation of seat section 282 and section 284.

Figure 16A:
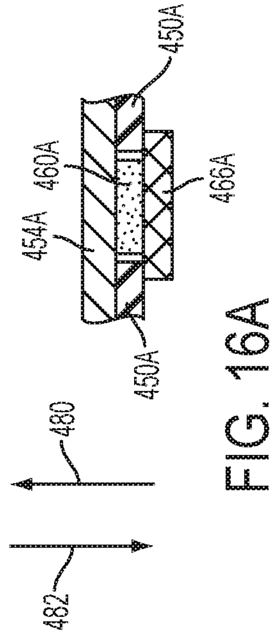
FIG. 16A is a sectional view taken along lines 16A-16A in FIG. 16.

Referring to FIG. 16, head section 280 includes a central plate 450A, a first side plate 452A, and a second side plate 454A. In one embodiment, central plate 450A is ⅜ inch thick aluminum and first side plate 452A and second side plate 454A are ¼ inch aluminum. First side plate 452A and second side plate 454A are slidably coupled to central plate 450A. As shown in FIG. 16A, second side plate 454A is coupled to a guide 460A which is received in an elongated slot 462A in central plate 450A. A retaining member 466A maintains second side plate 454A from tipping relative to central plate 450A. Each of first side plate 452A and second side plate 454A are slidably coupled to central plate 450A through multiple arrangements as shown in FIG. 16A.

Central plate 450A further supports a central support 470A. When first side plate 452A and second side plate 454A are retracted, as shown in FIG. 18, a top surface of each of first side plate 452A and second side plate 454A are horizontally aligned with a top surface of central support 470A. In one embodiment, the entire upper surface of support deck 110 is covered with a cover that stretches as support deck 110 moves from the retracted configuration shown in FIG. 18 to the expanded configuration of FIG. 16.

In the illustrated embodiment, first side plate 452A is moved in one of direction 480 and direction 482 while second side plate 454A is moved in the opposite of direction 480 and direction 482 because both first side plate 452A and second side plate 454A are driven by the same powered system 500. The term powered means that the system is actuated by an electrical control system. In contrast, the term non-powered means that the system is actuated manually by an operator.

Figure 23:
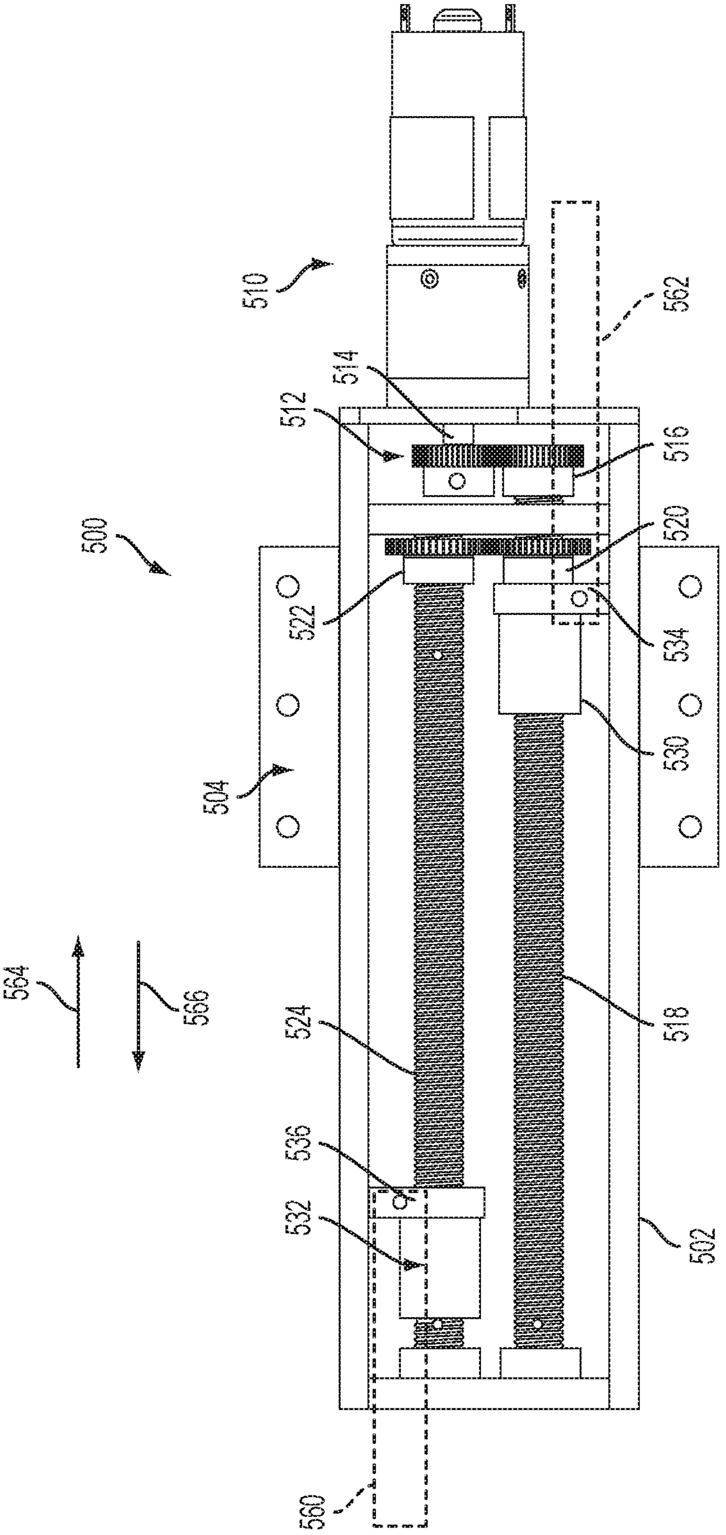
FIG. 23 is a top view of a powered system which expands and retracts the support deck of the bed of FIG. 1.
Figure 24:
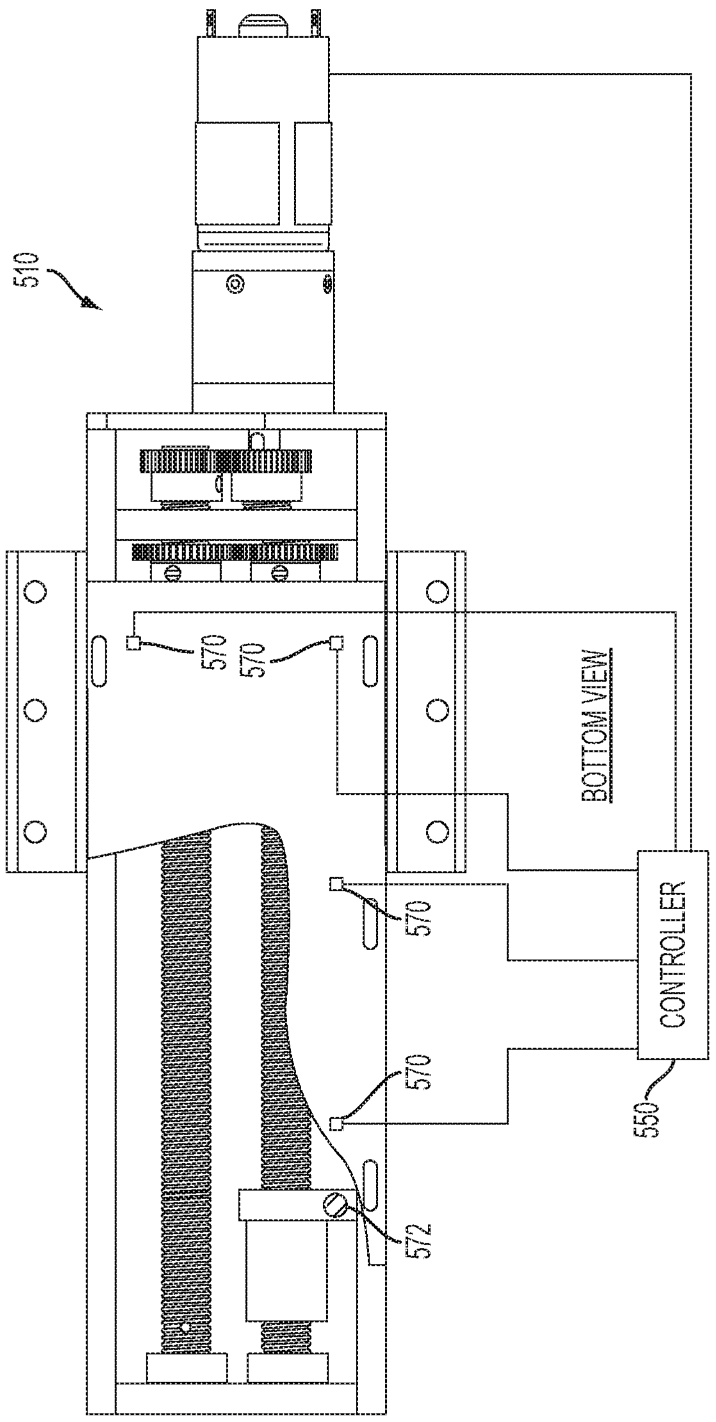
FIG. 24 is a bottom view of the powered system of FIG. 23 which expands and retracts the support deck of the bed of FIG. 1.

Referring to FIGS. 23 and 24, an exemplary powered system 500 is shown. Powered system 500 includes a frame 502 which is coupled to a bracket 504 that is secured to an underside of central plate 450A. A powered mechanical actuator 510 is supported by frame 502. In the illustrated embodiment, powered mechanical actuator 510 is an electric motor having a gear 512 coupled to its output shaft 514. An exemplary electric motor is P/N 14201 available from Pittman Products located at 343 Godshall Drive in Harleysville, Pa. 19438.

Gear 512 drives a second gear 516 supported by frame 502. Second gear 516 is coupled to threaded rod 518 that is rotatable relative to frame 502. A third gear 520 is coupled to threaded rod 518 to rotate with threaded rod 518. Third gear 520 drives a fourth gear 522. Fourth gear 522 is coupled to a second threaded rod 524 which is also rotatable relative to frame 502. When output shaft 514 rotates in a first direction, second threaded rod 524 also rotates in the first direction while threaded rod 518 rotates in a second direction, opposite the first direction.

A threaded carrier 530 is threadably coupled to threaded rod 518 and a threaded carrier 532 is threadably coupled to second threaded rod 524. Threaded carrier 530 supports a coupling block 534 while threaded carrier 532 supports a coupling block 536. Coupling block 536 is coupled to first side plate 452A through a link 560 (see FIG. 16). Coupling block 534 is coupled to second side plate 454A through a link 562 (see FIG. 16). In the arrangement shown in FIG. 23, first side plate 452A and second side plate 454A are in the expanded position shown in FIG. 16. Through the simultaneous rotation of threaded rod 518 and second threaded rod 524, coupling block 536 and coupling block 534 move in respective directions 564 and 566 resulting in first side plate 452A and second side plate 454A moving to the retracted position shown in FIG. 18.

Mounted on each shaft is a ball nut 101 that travels the length of the threaded rod from one stop pin 103 at one end of the threaded rod to the stop pin at the opposite end of the threaded rod. The distance and/or length the ball nuts travel between the stop pins is referred to as the stroke of the actuator. The ball nuts 101 are designed to spin free when they come in contact with their corresponding stop pin. This is to prevent the ball nuts 101 from seizing up by screwing tight should the drive motor 100 not shut off. The ball nuts 101 will continue to spin free until the threaded shaft reverses its rotational direction at which time the ball nut will re-engage the shaft.

In one embodiment, each of threaded carrier 530 and threaded carrier 532 are ball nuts. The ball nuts threadably engage the respective threaded shafts. However, if the ball nut reaches the end of its travel in frame 502 and the respective threaded screw is still being actuated to rotate, the ball nut slips and permits the threaded screw to rotate relative to the ball nut.

Referring to FIG. 24, a controller 550 having control logic is coupled to powered mechanical actuator 510 to drive powered mechanical actuator 510. The term "logic" or "control logic" as used herein includes software and/or firmware executing on one or more programmable processors, application-specific integrated circuits, field-programmable gate arrays, digital signal processors, hardwired logic, or combinations thereof. Therefore, in accordance with the embodiments, various logic may be implemented in any appropriate fashion and would remain in accordance with the embodiments herein disclosed. The terms "circuit" and "circuitry" refer generally to hardwired logic that may be implemented using various discrete components such as, but not limited to, diodes, bipolar junction transistors, field effect transistors, relays, solid-state relays, contactors, triacs, and other logic and power switches. Some of the circuits may be implemented on an integrated circuit using any of various technologies as appropriate, such as, but not limited to CMOS, NMOS and PMOS. A "logic cell" may contain various circuitry or circuits.

Controller 550 also receives inputs from a plurality of sensors 570. In the illustrated embodiment, sensors 570 are Hall effect sensors which provide an indication to controller 550 when a magnet 572 carried by a respective one of coupling block 534 and coupling block 536 passes in the proximity of the respective sensor. As such, by placing sensors at desired locations along the length of frame 502, controller 550 may be control the location of coupling block 534 and coupling block 536 along the respective threaded rods 518, 520 and thus control a width of head section 280 of support deck 110.

In one embodiment, controller 550 monitors sensors 570 provided only for one of coupling block 534 and coupling block 536. In one embodiment, sensors 570 are provided for both of coupling block 534 and coupling block 536. In this embodiment, controller 550 is able to monitor both of coupling block 534 and coupling block 536 and make sure that they are at the correct location in their travel to maintain support deck 110 centered on bed 100. If coupling block 534 and 536 are not at the correct location, since threaded carrier 530 and threaded carrier 532 are ball nuts, controller 550 may run powered mechanical actuator 510 to drive both of threaded carrier 530 and threaded carrier 532 to their respective limit positions. Thus, threaded carrier 530 and threaded carrier 532 are again synchronized.

As mentioned herein, the bed frame 102 supports a plurality of barrier components which form a barrier 112 around the support deck 110. Referring to FIG. 1, barrier 112 includes endboards 400A, 400B, a first set of head end siderails 700A, 700B coupled to head section 280 and a second set of foot end siderails 702A, 702B coupled to foot section 284. Each of siderails 700A, 700B moves with head section 280. Each of siderails 702A, 702B moves with foot section 284. Barrier 112 further includes a plurality of head end barrier components 710A, 710B which are pivotally coupled to head section 280 of support deck 110. Illustratively, head end barrier component 710A is pivotally coupled to first side plate 452A and head end barrier component 710B is pivotally coupled to second side plate 452B. Head end barrier component 710A and head end barrier component 710B overlap endboard 400A. In the same manner, barrier 112 further includes a plurality of foot end barrier components 712A, 712B pivotally coupled to foot section 284 and overlapping endboard 400B.

Figure 25:
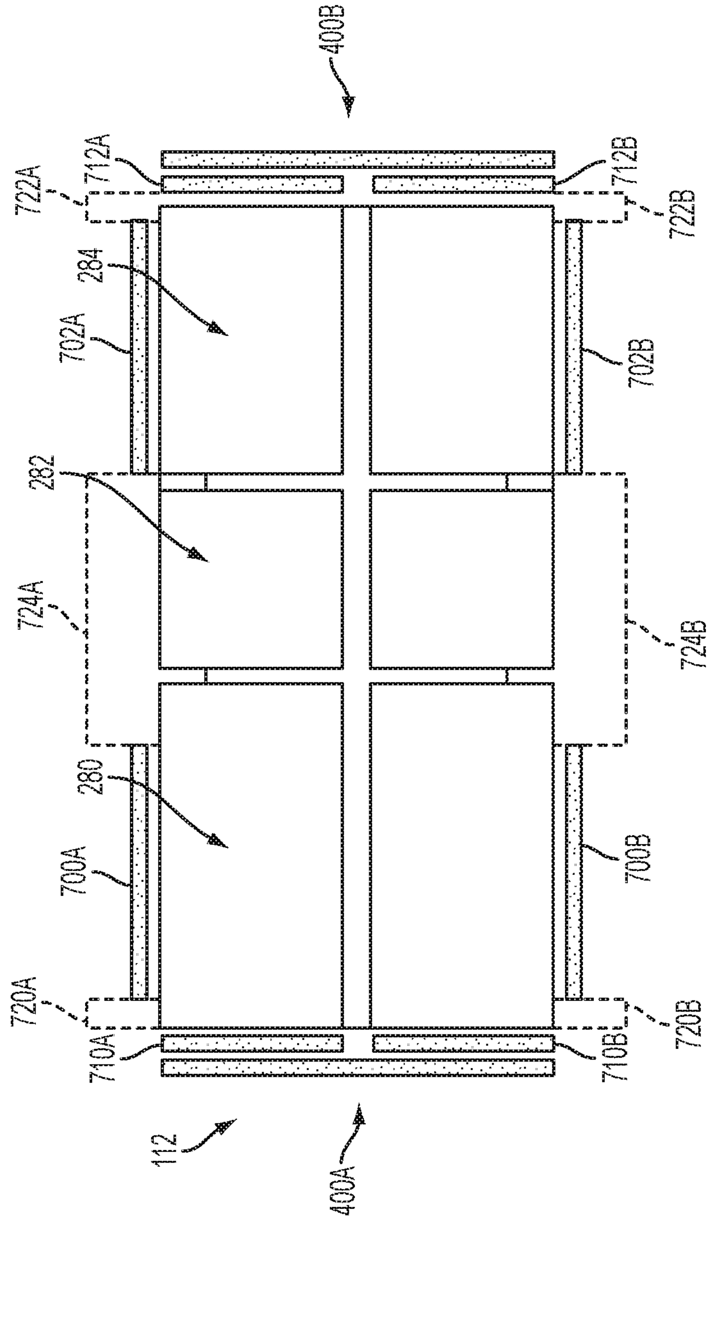
FIG. 25 is a representative top view of the support deck and barrier of the bed of FIG. 1 with the support deck in the retracted position of FIG. 18.

Referring to FIG. 25, a top view representation of support deck 110 and barrier 112 is shown correspond to support deck 110 being in the retracted position of FIG. 18. As shown barrier 112 surrounds support deck 110 although gaps are present between the various barrier components of barrier 112. These gaps may be filled with gap fillers as known in the art. In particular, a first set of gaps 720A, 720B are present between head end siderail 700A, head end siderail 700B and the combination of endboard 400A, head end barrier component 710A, and head end barrier component 710B. A second set of gaps 722A, 722B are present between end siderail 702A, end siderail 702B and the combination of endboard 400B, foot end barrier component 712A, and foot end barrier component 712B. A third set of gaps 724A, 724B are present between head end siderail 700A, 700B and end siderail 702A, 702B.

Figure 26:
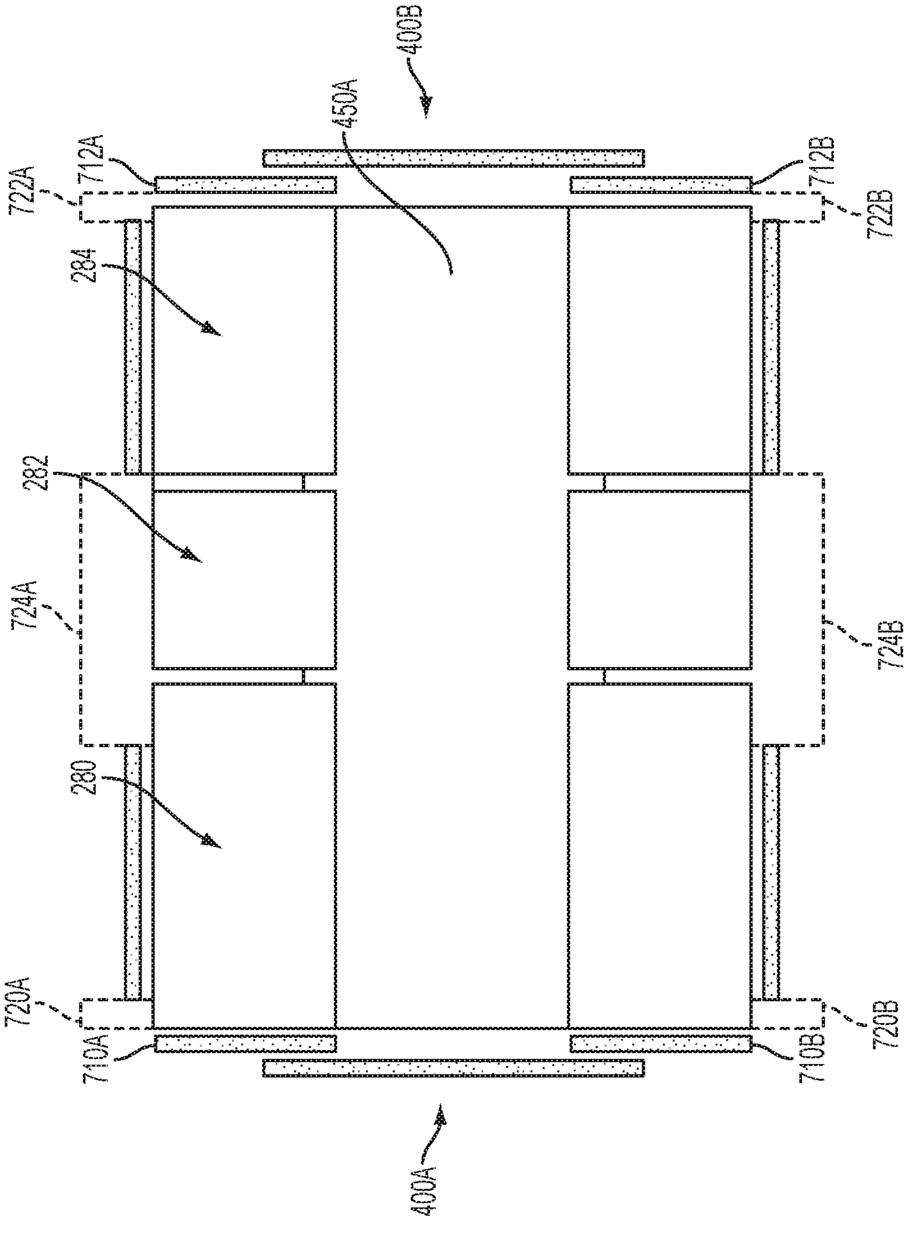
FIG. 26 is a representative top view of the support deck and barrier of the bed of FIG. 1 with the support deck in the expanded position of FIG. 18.

Referring to FIG. 26, the same top view representation of support deck 110 and barrier 112 is shown, but support deck 110 is expanded to correspond to the expanded position of FIG. 16. As shown in FIG. 26, the size of gaps 720A, 720B, 722A, 722B, 724A, and 724B is maintained as those shown FIG. 25. This is because the gaps are each between barrier components that move with support deck 110. Although separations are present between head end barrier component 710A and head end barrier component 710B and foot end barrier component 712A and foot end barrier component 712B, these are not gaps because the respective endboard 400A, 400B fills the respective separation.

Figure 28:
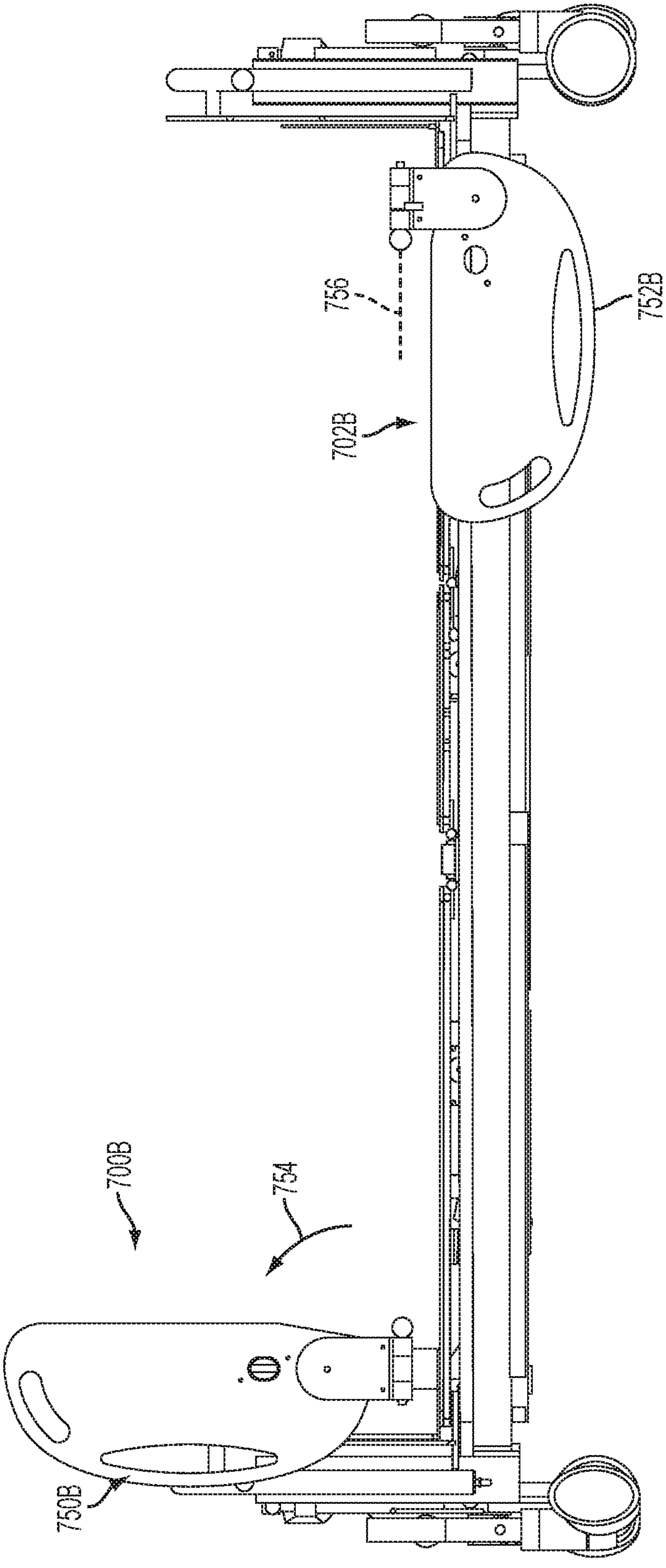
FIG. 28 is a side view of the bed of FIG. 1 with a head end siderail in a first open configuration and a foot end siderail in a second open configuration.

Referring to FIG. 1, siderails 700B and 702B are each shown in a closed configuration. Referring to FIG. 28, siderails 700B and 702B are each shown in an open configuration. Siderail 700B is shown rotated in direction 754 relative to support deck 110. A top portion 750B of siderail 700B is positioned proximate to endboard 400A. Siderail 702B is shown rotated downward about axis 756 relative to support deck 110. A top portion 752B of siderail 702B has moved from a position above support deck 110 to a position below support deck 110.

Figure 27:
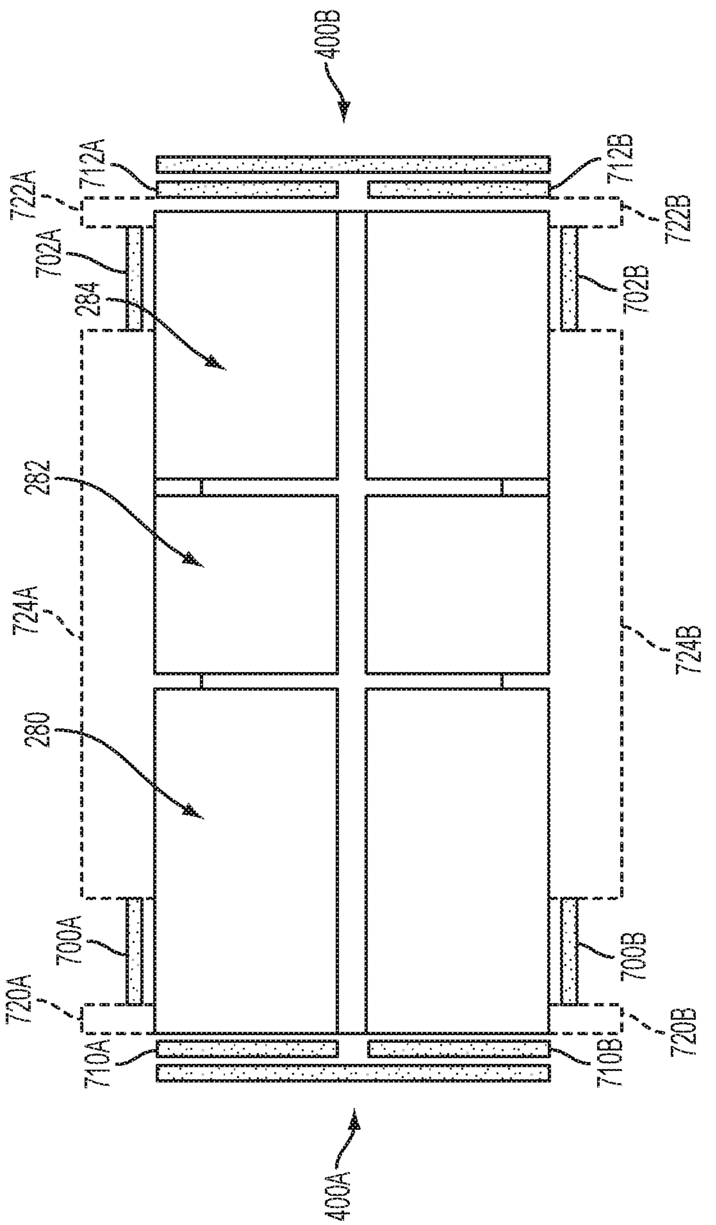
FIG. 27 is a representative top view of the support deck and barrier of the bed of FIG. 1 with the support deck in the retracted position of FIG. 18 and the siderails in an open configuration.

When support deck 110 is in the lowered position of FIG. 2, head end siderail 700B and end siderail 702B cannot move to the open configuration shown for end siderail 702B in FIG. 28 because the respective top portions 750B and 752B would contact floor 106. However, each may move to the open configuration shown for head end siderail 700B in FIG. 28. Referring to FIG. 27, all four siderails 700A, 700B, 702A, and 702*b* are represented rotated upwards in the open configuration shown for head end siderail 700B in FIG. 28. As shown, the size of gaps 724A, 724B is substantially increased.

Figure 29:
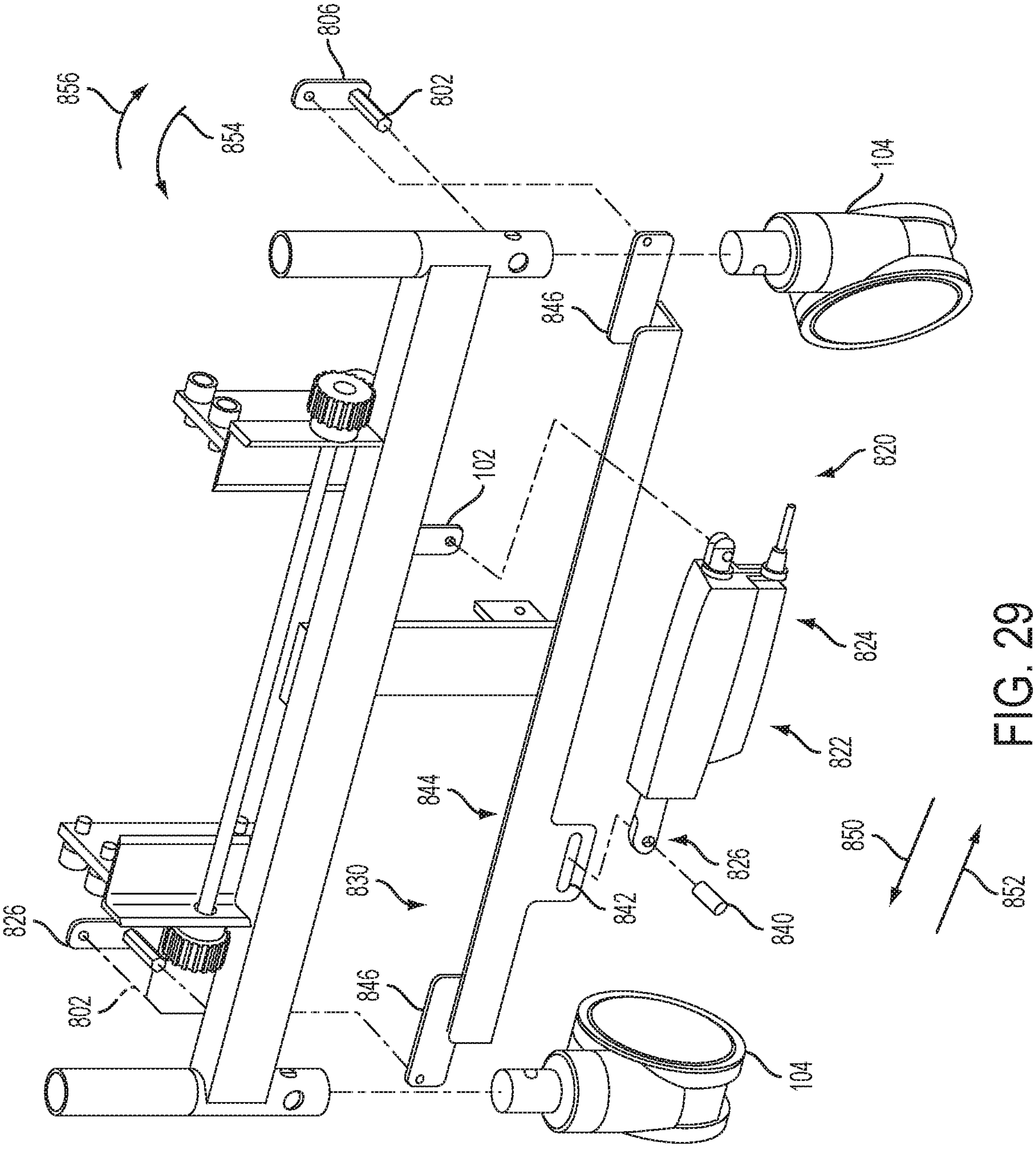
FIGS. 29 and 30 illustrate exemplary components of a non-powered caster brake system and a powered caster brake system.
Figure 30:
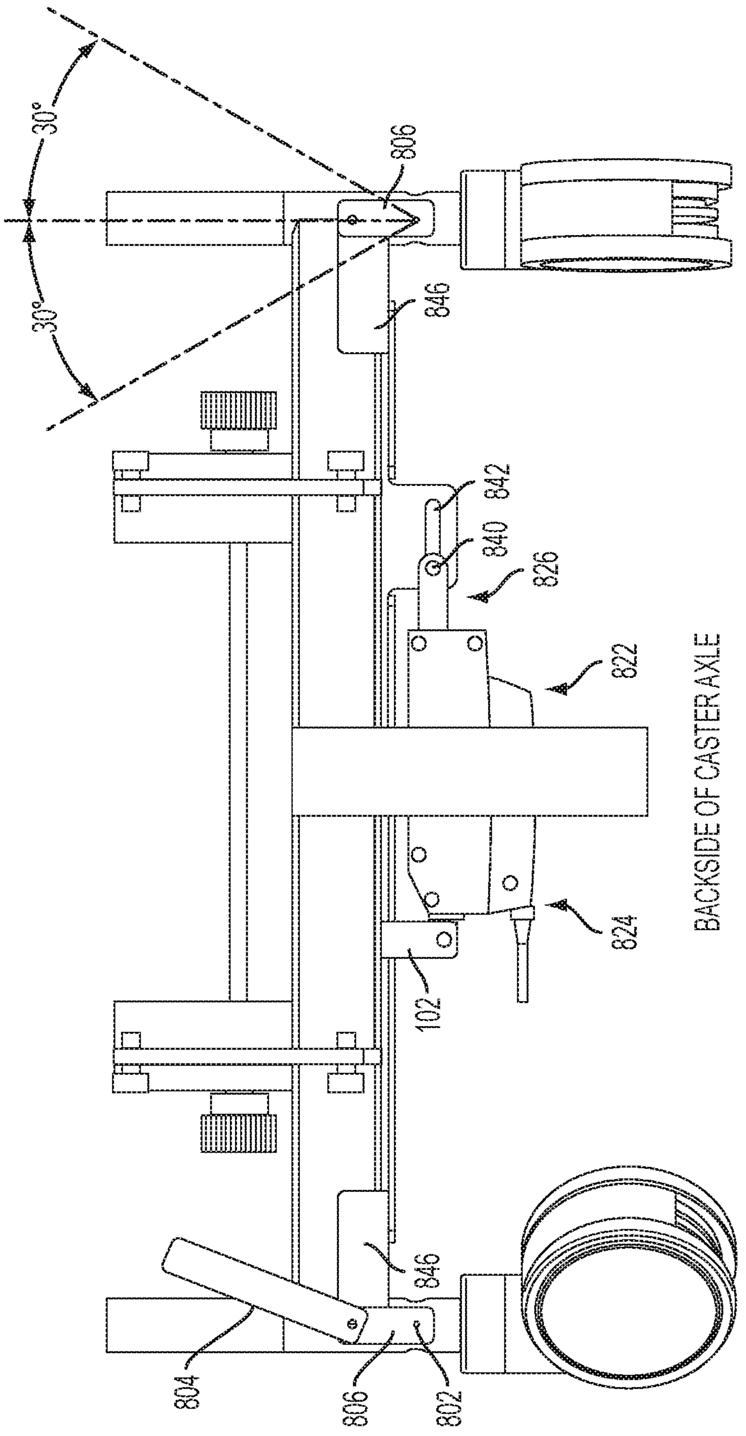

Referring to FIGS. 29 and 30, an exemplary caster braking system 800 is shown. In one embodiment, wheels 104 are 6" Swivel/Total Lock Directional Lock casters available from TENTE CASTERS Inc. located at 2266 Southpark Drive in Hebron, Ky. 41048. A hex shaft 802 is received in the caster assembly and may be rotated to place the caster assembly in one of three modes. A first mode is a locked position also referred to as brake which prevents bed 100 from moving and/or being moved relative to floor 106. A second mode is the caster mode in which the caster is set to allow bed 100 to be freely rolled and/or move from one place to another relative to floor 106. A third mode is steer mode when the caster is set to roll in a fixed direction. The caster includes an internal mechanism which is actuated by rotation of hex shaft 802 a fixed number of degrees in either direction. As shown in FIG. 30, a lever 804 is coupled to hex shaft 802 through an extension 806 to rotate hex shaft 802. Lever 804 may be grasped by an operator and pulled or pushed to rotate hex shaft 802. This is an example of a non-powered caster wheel control system.

A powered caster wheel control system 820 is also provided to actuate hex shaft 802. Referring to FIG. 29, powered caster wheel control system 820 includes a linear actuator 822 which is operatively coupled to bed frame 102 on a first end 824 and operatively coupled to a mechanical linkage assembly 830 on a second end 826. As is known, linear actuator 822 can alter a separation between first end 824 and second end 826 to lengthen or shorten the separation.

In the illustrated embodiment, second end 826 is coupled to a pin 840 which is received in an elongated slot 842 of a transversely extending member 844. member 844 is coupled to a plurality of wings 846. Each wing is pivotally coupled to respective extensions 806. When linear actuator 822 drives member 844 in direction 850, both of the extensions 806 are rotated in direction 854 which in turn rotates hex shaft 802 in direction 854. When linear actuator 822 drives member 844 in direction 852, both of the extensions 806 are rotated in direction 856 which in turn rotates hex shaft 802 in direction 856.

As shown in FIG. 30, pin 840 is received in elongated slot 842. Assuming pin 840 is centered in elongated slot 842 before linear actuator 822 is actuated to cause a rotation of hex shaft 802, pin 840 is first be moved to an end of elongated slot 842 before member 844 begins to move. In one embodiment, after linear actuator 822 has effected the desired movement of hex shaft 802, linear actuator 822 reverses direction and centers pin 840 in elongated slot 842. By having pin 840 centered in elongated slot 842, an operator may grasp lever 804 and change the mode of wheels 104 independent of powered caster wheel control system 820.

Figure 31:
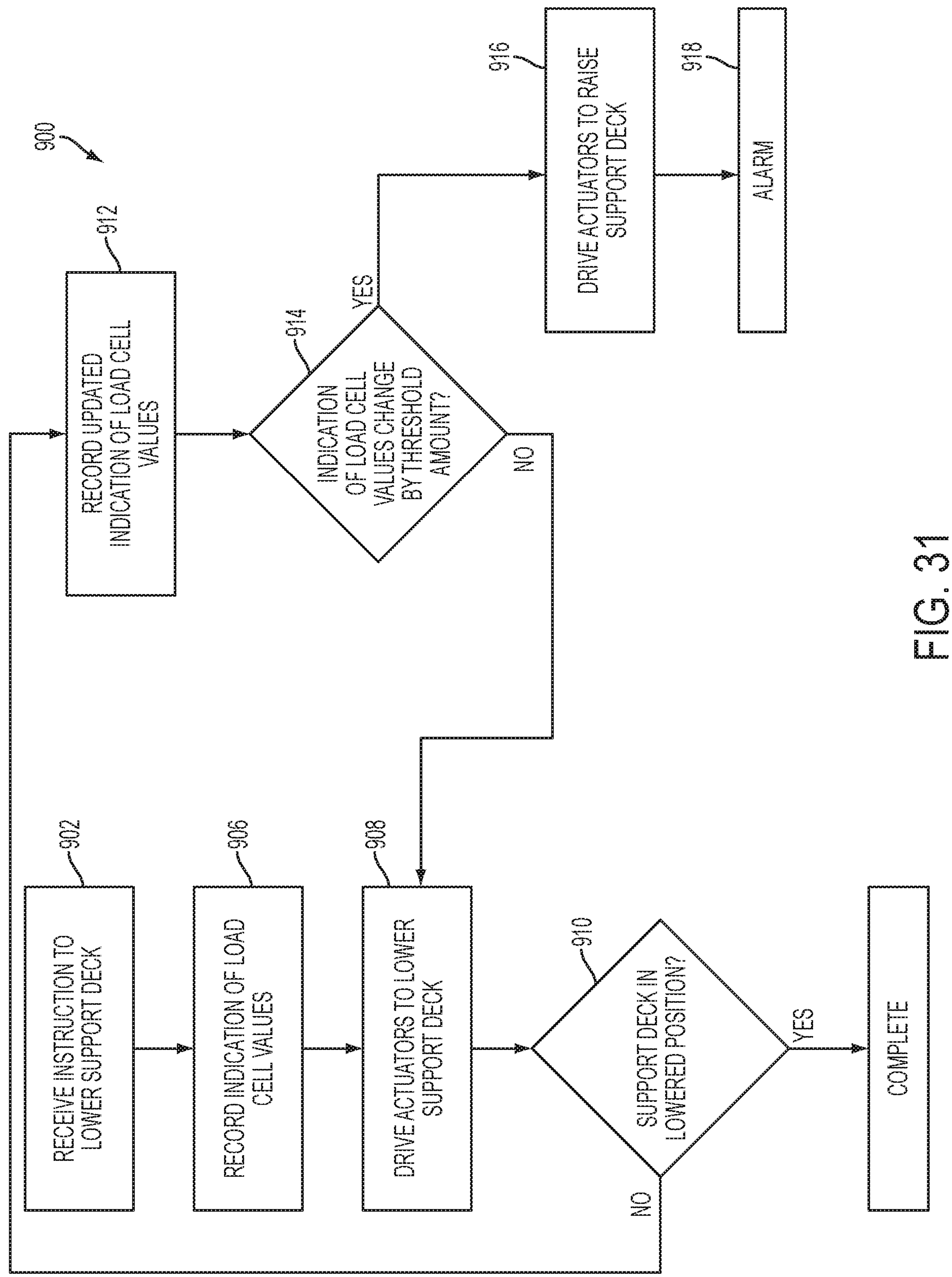
FIG. 31 illustrates an exemplary obstacle detection method.

Referring to FIG. 31, an exemplary obstacle detection method 900 is shown. In one embodiment, method 900 is implemented as logic executed by controller 550. The obstacle detection method 900 is used to determine if an obstacle is present under lift system 120 as support deck 110 is being moved to the lowered position of FIG. 2.

An instruction to lower the support deck is received by controller 550, as represented by block 902. In one embodiment, bed 100 includes a control interface that includes an input which when actuated provides an indication to controller 550 to lower support deck 110. Controller 550 records an indication of the load cell 230 values, as represented by block 906. In one embodiment, the indication is a determined weight. In one embodiment, the indication is the individual outputs of the load cells 230. Controller 550 then provides an input to the respective actuators to lower support deck 110, as represented by block 908.

Controller 550 determines if support deck 110 is in the lowered position, as represented by block 910. If not, controller 550 records an updated indication of the load cell values, as represented by block 912. Powered system 500 compares the updated indication of the load cell values to the prior indication of the load cell values and determines if the difference exceeds a threshold value, as represented by block 914. If the threshold value is not exceeded, controller 550 continues to lower support deck 110 as represented by block 908. If the threshold is exceeded, controller 550 halts the lowering of support deck 110 and instructs the actuators to raise support deck 110, as represented by block 916. Further, controller 550 initiates an alarm, as represented by block 918. Exemplary alarms include visual alarms, audio alarms, and tactile alarms.

In one embodiment, when an obstacle is present under bed 100, one of first lift system 158 and second lift system 160 will contact the obstacle as support deck 110 is being lowered. This results in the obstacle supporting part of the weight of support deck 110. This changes the weight being supported by load cells 230 or at least redistributes the weight between the load cells 230.

While this disclosure includes particular examples, it is to be understood that the disclosure is not so limited. Numerous modifications, changes, variations, substitutions, and equivalents will occur to those skilled in the art without departing from the spirit and scope of the present disclosure upon a study of the drawings, the specification, and the following claims.

The invention claimed is:

1. A bed adapted to be supported on a floor, comprising:
- a plurality of wheels contacting the floor;
- a lower frame supported by the plurality of wheels;
- an upper frame movably coupled to the lower frame and comprising a first longitudinal member extending from a frame head end to a frame foot end and comprising a second longitudinal member extending from the frame head end to the frame foot end;
- a support deck supported by the upper frame and having a head end, a foot end, a first side extending from the head end to the foot end, and a second side extending from the head end to the foot end, the support deck being expandable in a transverse extent from the first side to the second side from a first size to a second size, the second size having a larger area than the first size, the support deck comprising a head section, a seat section and a foot section that are articulatably coupled to the upper frame, the support deck comprising:
- a central plate,
- a first side plate slidably coupled to the central plate, the first side plate and the central plate being arranged in an overlapping arrangement,
- a second side plate slidably coupled to the central plate, the second side plate and the central plate being arranged in an overlapping arrangement, and
- wherein the central plate supports a central support and the first side plate having a top surface, the second side plate having a top surface and wherein the central support comprises a top surface that aligns horizontally with the respective top surfaces of the first and second side plates.

2. The bed of claim 1, wherein the second side plate and the first side plate are arranged in a side-by-side, non-overlapping arrangement.

3. The bed of claim 1, wherein the first side plate is supported directly by the central plate, an outer side of the first side plate is unsupported when the support deck is expanded to the second size.

4. The bed of claim 1 wherein a head section comprises the first and second plates and a seat section comprises third and fourth plates slidably coupled to the central plate and wherein at least the head section and the seat section are configured to be individually controlled to expand and retract to different widths with respect to each other.

5. The bed of claim 1 wherein the central plate comprises a first slot and the first plate comprises a first guide adapted to slidably engage with the first slot and the central plate comprises a second slot and the second plate comprises a second guide adapted to slidably engage with the second slot.

6. The bed of claim 1 wherein the lower frame comprises a pair of longitudinally extending members which extends from the frame head end to the frame foot end, and the bed further comprising a first lift system supported by the plurality of wheels and operatively coupled to the support deck to raise and lower the support deck relative to the plurality of wheels while the plurality of wheels remain stationary.

7. The bed of claim 6 wherein the plurality of wheels define a horizontally extending envelope and wherein both of the first lift system and a second lift system are at least partially positioned within the horizontally extending envelope defined by the plurality of wheels.

8. The bed of claim 1 wherein the support deck is configured to raise and lower relative to the plurality of wheels while the plurality of wheels remain stationary.

* * * * *